(12) United States Patent
Takayama et al.

(10) Patent No.: US 12,027,179 B1
(45) Date of Patent: Jul. 2, 2024

(54) THERMALLY ASSISTED MAGNETIC HEAD, LIGHT SOURCE UNIT BAR LIKE MEMBER, AND HARD DISK DRIVE

(71) Applicant: SAE MAGNETICS (H.K.) LTD., Shatin (HK)

(72) Inventors: Seiichi Takayama, Shatin (HK); Ryuji Fujii, Shatin (HK); Yasutoshi Fujita, Shatin (HK); Ka Yip Wong, Shatin (HK); Chi Hung Yuen, Shatin (HK)

(73) Assignee: SAE MAGNETICS (H.K.) LTD., Shatin (HK)

( * ) Notice: Subject to any disclaimer, the term of this patent is extended or adjusted under 35 U.S.C. 154(b) by 0 days.

(21) Appl. No.: 18/324,695

(22) Filed: May 26, 2023

(51) Int. Cl.
*G11B 11/105* (2006.01)
*G11B 5/48* (2006.01)
*G11B 13/08* (2006.01)
*G11B 5/00* (2006.01)

(52) U.S. Cl.
CPC ...... *G11B 13/08* (2013.01); *G11B 2005/0021* (2013.01)

(58) Field of Classification Search
CPC ..... G11B 5/4826; G11B 5/486; G11B 5/4833; G11B 5/1272; G11B 2005/0021; G11B 11/10534; G11B 11/10058; G11B 11/10506; G11B 11/1051; G11B 7/127; G11B 5/6088; G11B 5/314; G11B 11/10504

USPC .............................................. 360/59; 369/121
See application file for complete search history.

(56) References Cited

U.S. PATENT DOCUMENTS

| 8,310,903 | B1 | 11/2012 | Takayama et al. |
| 9,437,227 | B1* | 9/2016 | Honda ................. G11B 5/4826 |
| 2011/0228650 | A1 | 9/2011 | Shimazawa et al. |
| 2013/0322221 | A1 | 12/2013 | Naniwa et al. |
| 2014/0209664 | A1 | 7/2014 | Takayama et al. |
| 2015/0131415 | A1 | 5/2015 | Peng |

\* cited by examiner

*Primary Examiner* — Nabil Z Hindi
(74) *Attorney, Agent, or Firm* — Oliff PLC

(57) ABSTRACT

A thermally assisted magnetic head includes a slider having a slider substrate and a magnetic head part, and a light source unit having a laser diode and a sub-mount. The magnetic head part includes a medium-opposite surface, a light source-opposite surface, and a slider-front end surface. The sub-mount includes a joined-end surface and a mount-front end surface, the laser diode includes an electrode surface and an LD-front end surface. The light source unit includes a shift joined structure which the laser diode is joined to a shift area of the joined-end surface, and the light source unit is mounted on the slider substrate so that the electrode surface intersects with a laminated surface of the magnetic head part. The shift area is set in a position which is shifted so that the LD-front end surface is away from the slider-front end surface than the mount-front end surface.

12 Claims, 33 Drawing Sheets

THERMALLY ASSISTED MAGNETIC HEAD, LIGHT SOURCE UNIT BAR LIKE MEMBER, AND HARD DISK DRIVE

BACKGROUND

1. Technical Field

The present disclosure relates to a thermally assisted magnetic head, a light source unit bar like member, and a hard disk drive.

2. Description of Related Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magneto resistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium.

Then, as a method of generating the near-field light, in the conventional thermally assisted magnetic head, a method, which a plasmon generator (also called "PG") being a minute metal piece is used, is known. In this method, the near-field light is generated by guiding laser light to the PG via an optical waveguide.

In this case, it is preferable that a semiconductor laser such as laser diode (also called "LD") or the like, which is a light source of laser light, is arranged in the neighborhood of the PG. Then, structures, which are disclosed for example, in U.S. Patent Application Publication No. 2011/0228650A1 (referred also to as patent document 1), U.S. Patent Application Publication No. 2014/0209664A1 (referred also to as patent document 2), U.S. Patent Application Publication No. 2015/0131415A1 (referred also to as patent document 3), U.S. Pat. No. 8,310,903 (referred also to as patent document 4), are conventionally known. The semiconductor laser is fixed on the slider, and laser light of the semiconductor laser are guided to the optical waveguide of the slider, in these structures.

SUMMARY

By the way, edge-emitting LDs and surface-emitting LDs are included in the LD, which is a light source of laser light. And LD of TE (Transverse Electric) mode (TE mode LD) and LD of TM (Transverse Magnetic) mode (TM mode LD) are included in the edge-emitting LDs. The TE mode is a mode which laser light, having the polarization parallel to a semiconductor substrate, is emitted, the TM mode is a mode which laser light, having the polarization vertical to the semiconductor substrate, is emitted. Edge-emitting LDs of TE mode and Edge-emitting LDs of TM mode are used as the light source of laser light, in the thermally assisted magnetic head.

Further, in the thermally assisted magnetic head, PGs are formed so that their conversion efficiency become maximum when the polarization of laser light emitted from LD is orthogonal to a laminated surface of the thermally assisted magnetic head. Then, PGs are formed corresponding to the LDs used as the light source of laser light. Namely, when the LD is the TE mode LD, the PGs are formed with structure corresponding to laser light of TE mode. Further, when the LD is the TM mode LD, the PGs are formed with structure corresponding to laser light of TM mode.

Conventionally, concerning the thermally assisted magnetic head, for example, following structures are disclosed in U.S. Patent Application Publication No. 2013/0322221A1 (referred also to as patent document 5), U.S. Pat. No. 9,437,227 (also called patent document 6). The TE mode LD is used, and the PG is formed with TM mode LD in the structure. Further, the direction, of the TE mode LD, is modified into the 90 degrees-turned direction so that the substrate surface of the TE mode LD intersects orthogonally with the laminated surface of the thermally assisted magnetic head, and the TE mode LD is mounted on the slider so that the TE mode LD and the sub-mount are arranged in a row along with the direction of the side surface of the slider. Laser light emitted from the TE mode LD is guided to the PG with the structure.

However, the following problems, concerning the conventional thermally assisted magnetic head having the above structure, have not been solved. This point will be explained in the following.

The thermally assisted magnetic head is mounted on the suspension. Head Gimbal Assembly (hereinafter, referred to also "HGA") is manufactured with the suspension. In this case, hole parts are formed in the flexure and load beam, of the suspension, and the thermally assisted magnetic head is mounted to the suspension so that the TE mode LD pass through the hole parts.

Further, as the TE mode LD, the lased diode 472, which is illustrated in FIG. 31 to FIG. 33, is known. The laser diode 472 has six side surfaces though, side surfaces 472a, 472b, being arranged in a direction which is intersecting orthogonally with the slider 361, are slanting surfaces. The side surfaces 472a, 472b are slanting so as to approach an outside end surface 361E of the slider 361 as it is distanced more from the sub-mount 371.

When the laser diode 472 is mounted on the slier 361 in addition with the sub-mount 371, the side surface 472a sometimes protrudes outside than a side surface 371a of the sub-mount 371. At this time, as illustrated in FIG. 33, an interval D472, between the side surface 472a and the wiring electrode 362, is formed with size which is smaller than an interval D371, between the side surface 371a and the wiring electrode 362. Therefore, an active layer 472c of the laser diode 472 is arranged in a neighborhood of the wiring electrode 362. Accordingly, wiring short or failure also occur in the thermally assisted magnetic head 360A which the laser diode 472 is used, as similar with the thermally assisted magnetic head 360 which the laser diode 372 is used.

Hence the present disclosure is made to improve reliability of the hard disk drive, in the case which the thermally assisted magnetic head includes the transverse placing structure, concerning the TE mode LD and the sub-mount. [0021] The present disclosure is a thermally assisted magnetic head including: a slider; and a light source unit which is joined to the slider, the slider includes a slider substrate and a magnetic head part formed on the slider substrate, the slider substrate comprises a light source placing surface which the light source unit is placed, the light source unit includes a laser diode and a sub-mount which the laser diode is joined, the magnetic head part includes a medium-opposite surface opposite to a magnetic recording medium, a light source-opposite surface arranged rear side of the medium-opposite surface, a waveguide which guides laser light, output from the laser diode, from the light source-opposite surface to the medium-opposite surface and a slider-front end surface which is connected with the medium-opposite surface and the light source-opposite surface, and having a width being common with the medium-opposite surface and the light source-opposite surface, the sub-mount includes a joined-end surface which the laser diode is joined and a mount-front end surface, which intersects with the joined-end surface, and arranged in a direction being along with the slider-front end surface, the laser diode includes an electrode surface and an LD-front end surface, which intersects with the electrode surface, and arranged in a direction being along the mount-front end surface, the light source unit includes a shift joined structure which the laser diode is joined to a shift area of the joined-end surface and the light source unit is mounted on the light source placing surface so that the electrode surface of the laser diode intersects with a laminated surface of the magnetic head part, the shift area is set in a position which is shifted so that the LD-front end surface is away from the slider-front end surface than the mount-front end surface.

In case of the above-described thermally assisted magnetic head, it is preferable that parts of the laser diode and the sub-mount are arranged on the magnetic head part.

Further, in case of the above-described thermally assisted magnetic head, it is possible that the laser diode includes an electrode bottom surface, being along with the electrode surface, the sub-mount comprises a shift concave part having a size larger than the electrode bottom surface of the laser diode, the shift concave part is formed in the shift area of the joined-end surface, the electrode bottom surface is fitted in the shift concave part and the laser diode is joined to the sub-mount.

Furthermore, it is possible that the sub-mount includes a positioning stopper which is formed between the shift area of the joined-end surface and the mount-front end surface, the laser diode is joined to the shift area, being contact with the positioning stopper so that the laser diode is away from the mount-front end surface.

Further, it is possible that the thermally assisted magnetic head, further including: a solder layer which is formed between a bottom part of the shift concave part and the electrode bottom surface of the laser diode, the shift concave part has a depth which is larger than the thickness of the solder layer. It is possible that the thermally assisted magnetic head, further including: a solder layer which is formed between the joined-end surface and the electrode bottom surface of the laser diode, the positioning stopper has a thickness which is larger than the thickness of the solder layer.

Furthermore, the present disclosure provides a light source unit bar like member including: a bar like member which is formed in a long-bar like form; and a plurality of laser diodes, the bar like member includes a mount-line structure including a long-bar like joined surface and a long-bar like front end surface intersecting with the long-bar like joined surface, the long-bar like joined surface and long-bar like front end surface are formed of a plurality of mount parts being arranged in a long bar-like form intervening scribe lines, the laser diodes respectively includes electrode surfaces and a LD-front end surfaces, a light source unit bar like member further includes a line-like shift-joined structure which the respective laser diodes are joined to the respective shift areas of the respective mount parts so that the LD-front end surface is along with the long-bar like front end surface, the shift area is set in a position which is shifted, with a certain size, on the long-bar like joined surface, along with the direction being away from an edge line where the long-bar like joined surface intersecting with the long-bar like front end surface.

In case of the light source unit bar like member, it is preferable that the laser diodes respectively includes electrode bottom surfaces, being along with the electrode surfaces, the respective sub-mounts includes shift concave parts having sizes larger than the electrode bottom surfaces of the laser diodes, the shift concave parts are formed in the shift areas of the respective mount parts in the long-bar like joined-end surface, the electrode bottom surfaces are fitted in the shift concave parts and the respective laser diodes are joined to the respective mount parts.

Further, it is preferable that the respective mount parts further include positioning stoppers which are formed between the shift areas of the long-bar like joined surface and the long-bar like front end surface, the respective laser diodes are joined to the shift areas, being contact with the positioning stoppers so that the laser diodes are away from the long-bar like front end surface.

Further, it is preferable that the light source unit bar like member, further including: solder layers which are formed between bottom parts of the shift concave parts and the electrode bottom surfaces of the laser diodes, the shift concave parts respectively have depths which are larger than the thicknesses of the solder layers. Further, it is preferable that the light source unit bar like member further including: solder layers which are respectively formed between the long-bar like joined surface and the electrode bottom surface of the laser diode, the positioning stoppers respectively have thicknesses which are larger than the thicknesses of the solder layers.

Further, the present disclosure provides a hard disk drive including a head gimbal assembly and a magnetic recording medium, the head gimbal assembly includes a thermally assisted magnetic head and a suspension, the thermally assisted magnetic head includes a slider, and a light source unit which is joined to the slider, the slider includes a slider substrate and a magnetic head part formed on the slider substrate, the slider substrate includes a light source placing surface which the light source unit is placed; the light source unit includes a laser diode and a sub-mount which the laser diode is joined, the magnetic head part comprises a medium-opposite surface opposing to a magnetic recording medium, a light source-opposite surface arranged rear side of the medium-opposite surface, a waveguide which guides laser light, output from the laser diode, from the light source-opposite surface to the medium-opposite surface and a slider-front end surface which is connected with the medium-opposite surface and the light source-opposite surface, and having a width being common with the medium-opposite surface and the light source-opposite surface; the sub-mount comprises a joined-end surface which the laser diode is joined and a mount-front end surface, which intersects to the joined-end surface, and arranged in a direction being along with the slider-front end surface; the laser diode includes an electrode surface and a LD-front end surface, which intersects to the electrode surface, and arranged in a direction being along with the mount-front end surface; the light source unit comprises a shift joined structure which the laser diode is joined to a shift area of the joined-end surface and the light source unit is mounted on the light source placing surface so that the electrode surface of the laser diode intersects to a laminated surface of the magnetic head part; in the shift area is set in a position which is shifted so that the LD-front end surface is away from the slider-front end surface than the mount-front end surface; the suspension includes a penetrating opening part which penetrates from a slider arrangement surface, which the slider is arranged, to a light source unit arrangement surface, which the light source unit is arranged, and a flexure which forms the slider arrangement surface; the head gimbal assembly further includes an assembly structure which the light source unit is inserted into the penetrating opening part from the slider arrangement surface of the suspension and the light source unit is protruded from the light source unit arrangement surface and the slider is adhered to the slider arrangement surface of the suspension, a LD solder connector being formed so that the laser diode is connected to the flexure, and a mount solder connector being formed so that the sub-mount is connected to the flexure.

The present disclosure will be more fully understood from the detailed description given hereinbelow and the accompanying drawings which are given by way of illustration only, and thus are not to be considered as limiting the present disclosure.

DETAILED DESCRIPTION

In the following, embodiments of the present disclosure will be described with reference to the drawings. Note that the same components will be referred to with the same numerals or letters, while omitting their overlapping descriptions.

(Structure of a Head Gimbal Assembly)

Figure 1:
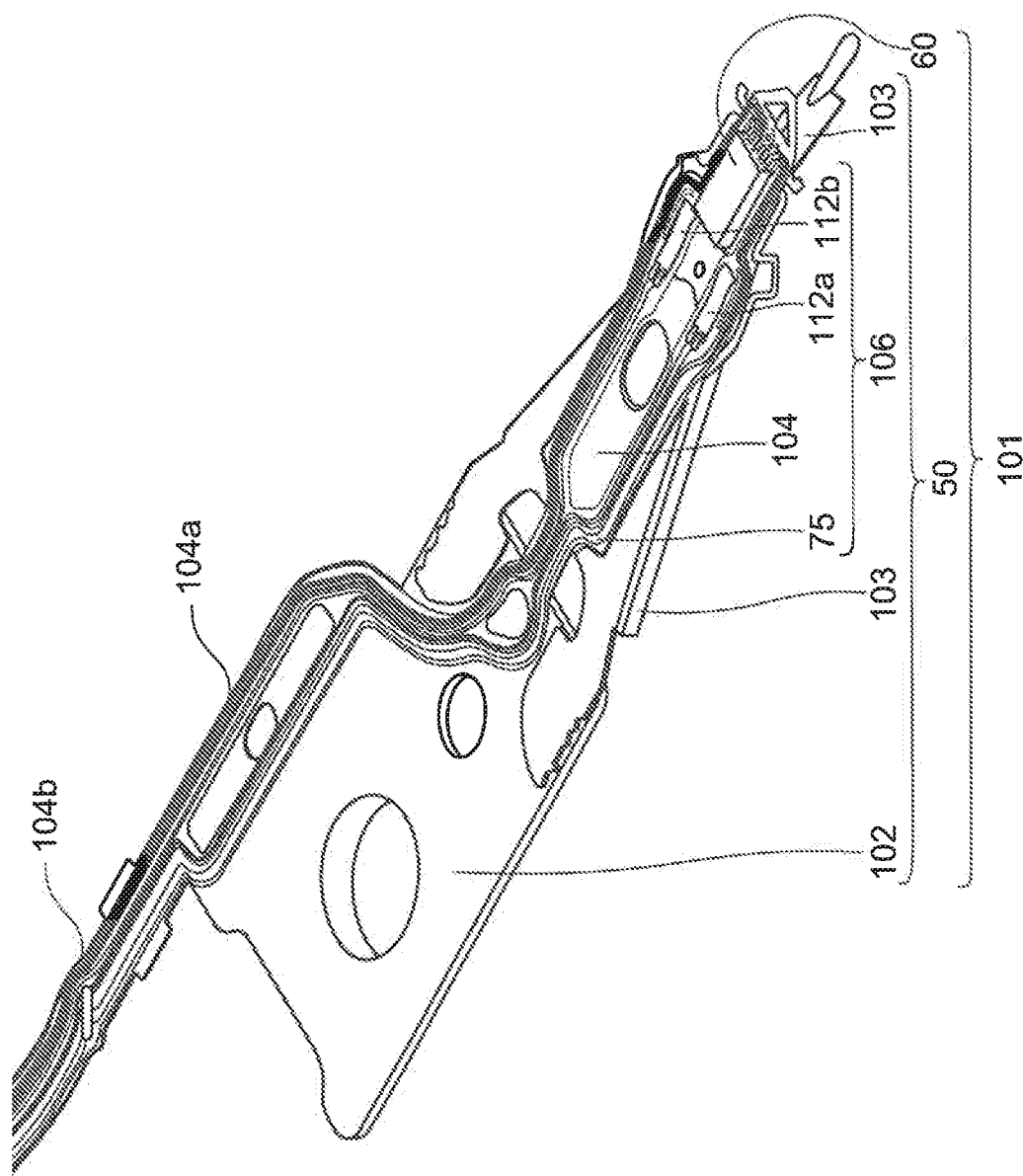
FIG. 1 is a perspective view of a whole HGA, seen from front side, according to an embodiment of the present disclosure.
Figure 2:
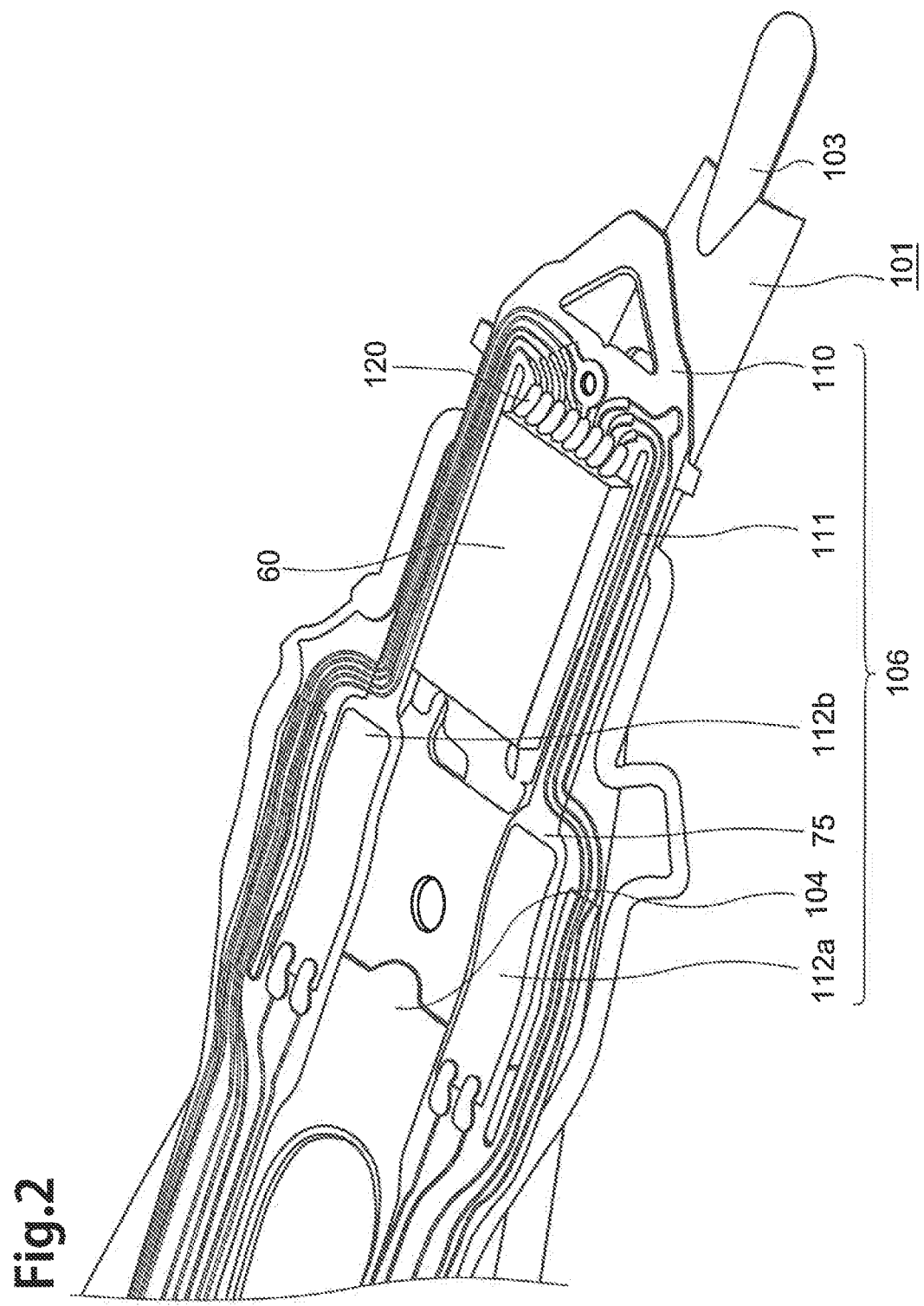
FIG. 2 is a perspective view, seen from the front side, of a principal part of the HGA, in FIG. 1.
Figure 3:
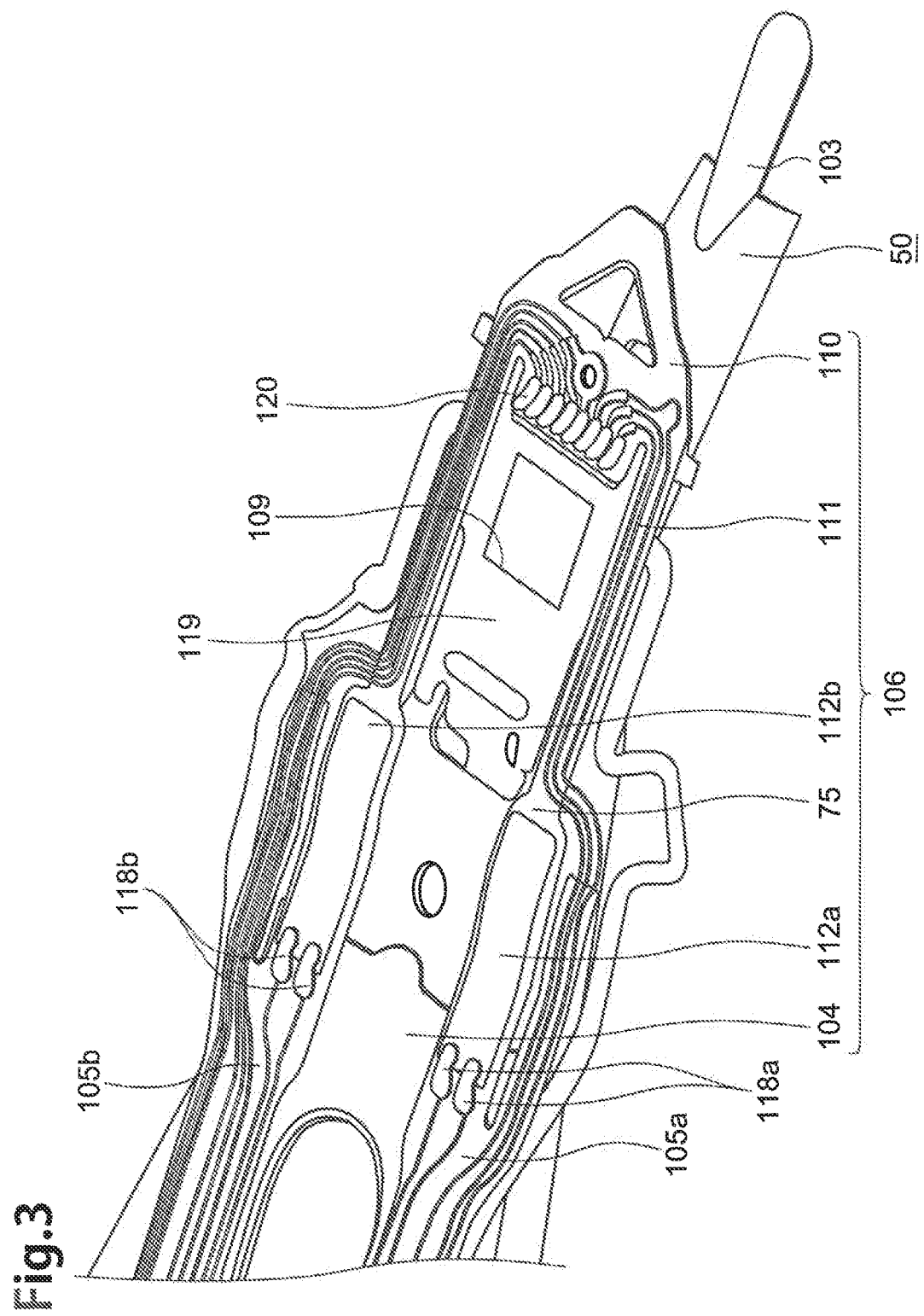
FIG. 3 is a perspective view, seen from the front side, of the principal part of the suspension constituting the HGA, in FIG. 1.
Figure 4:
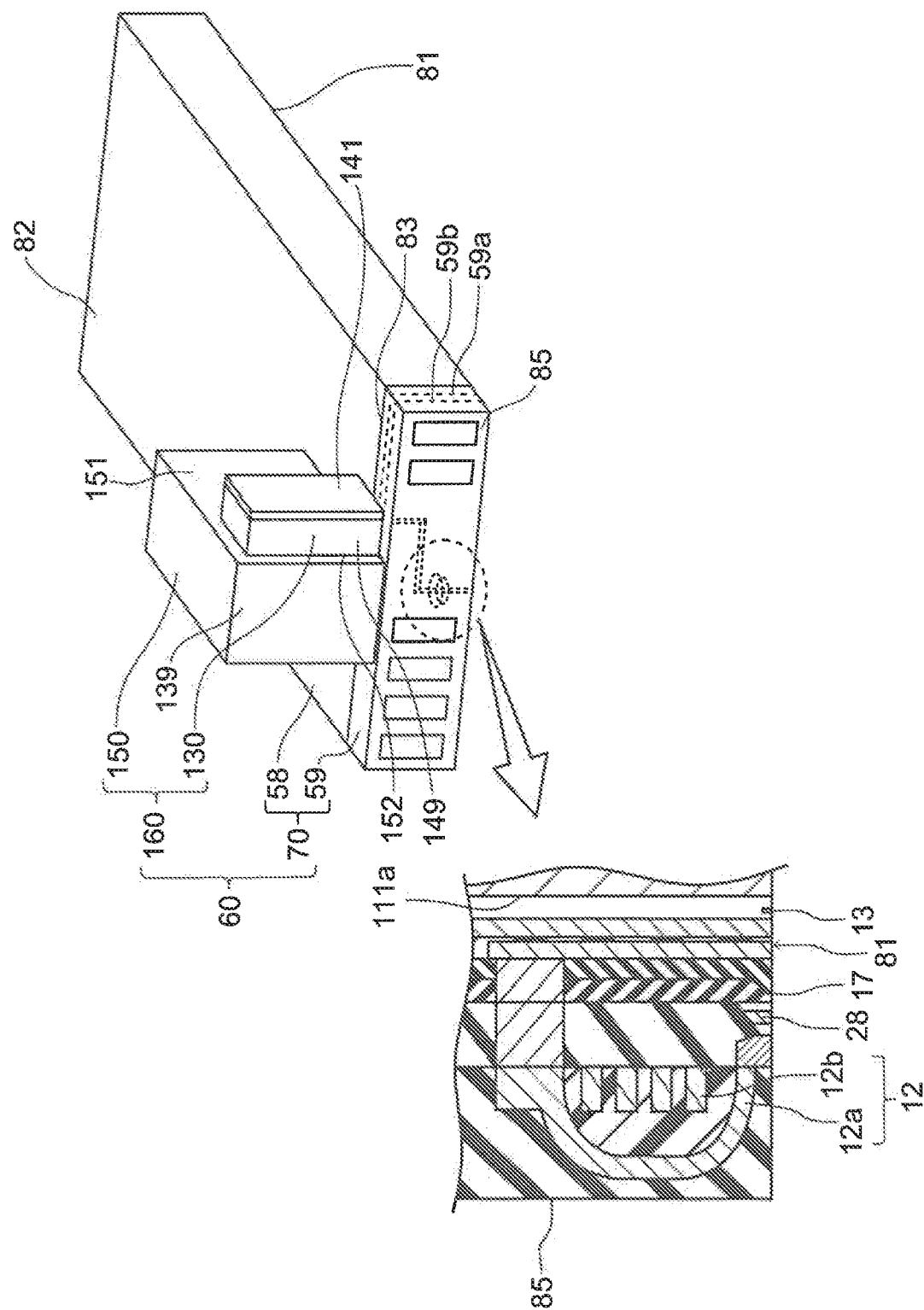
FIG. 4 is a perspective view of the thermally assisted magnetic head constituting the HGA, in FIG. 1.
Figure 5:
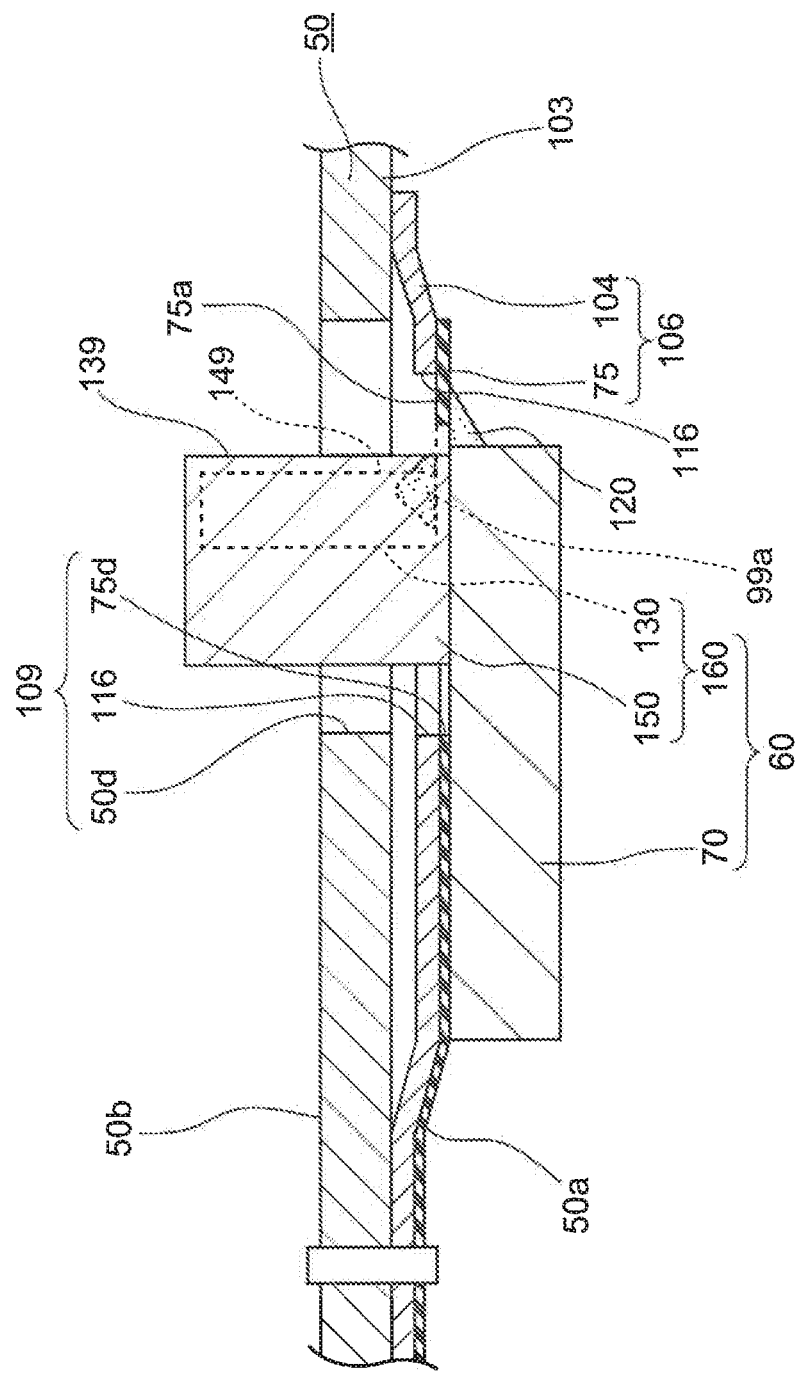
FIG. 5 is a sectional view of a principal part, of the HGA in FIG. 1, which is along with the length direction.
Figure 6:
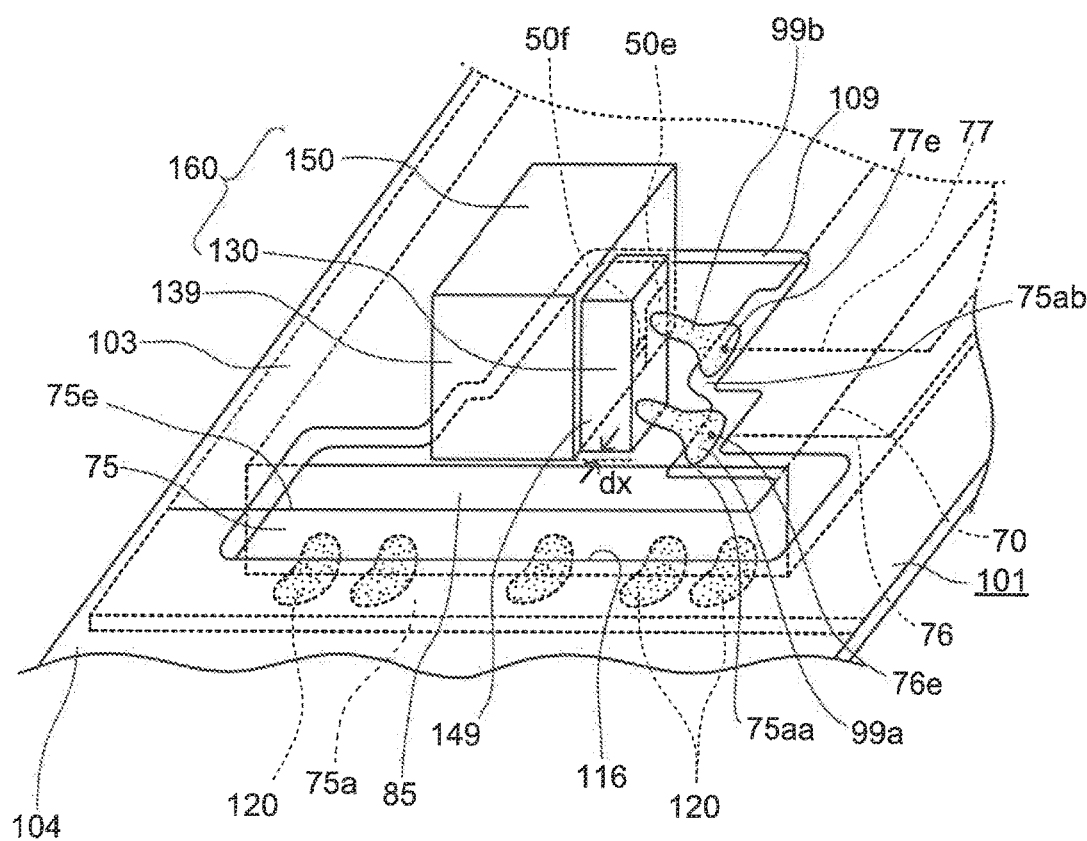
FIG. 6 is a perspective view, seen from rear side, showing the principal part of the HGA in FIG. 1.
Figure 7:
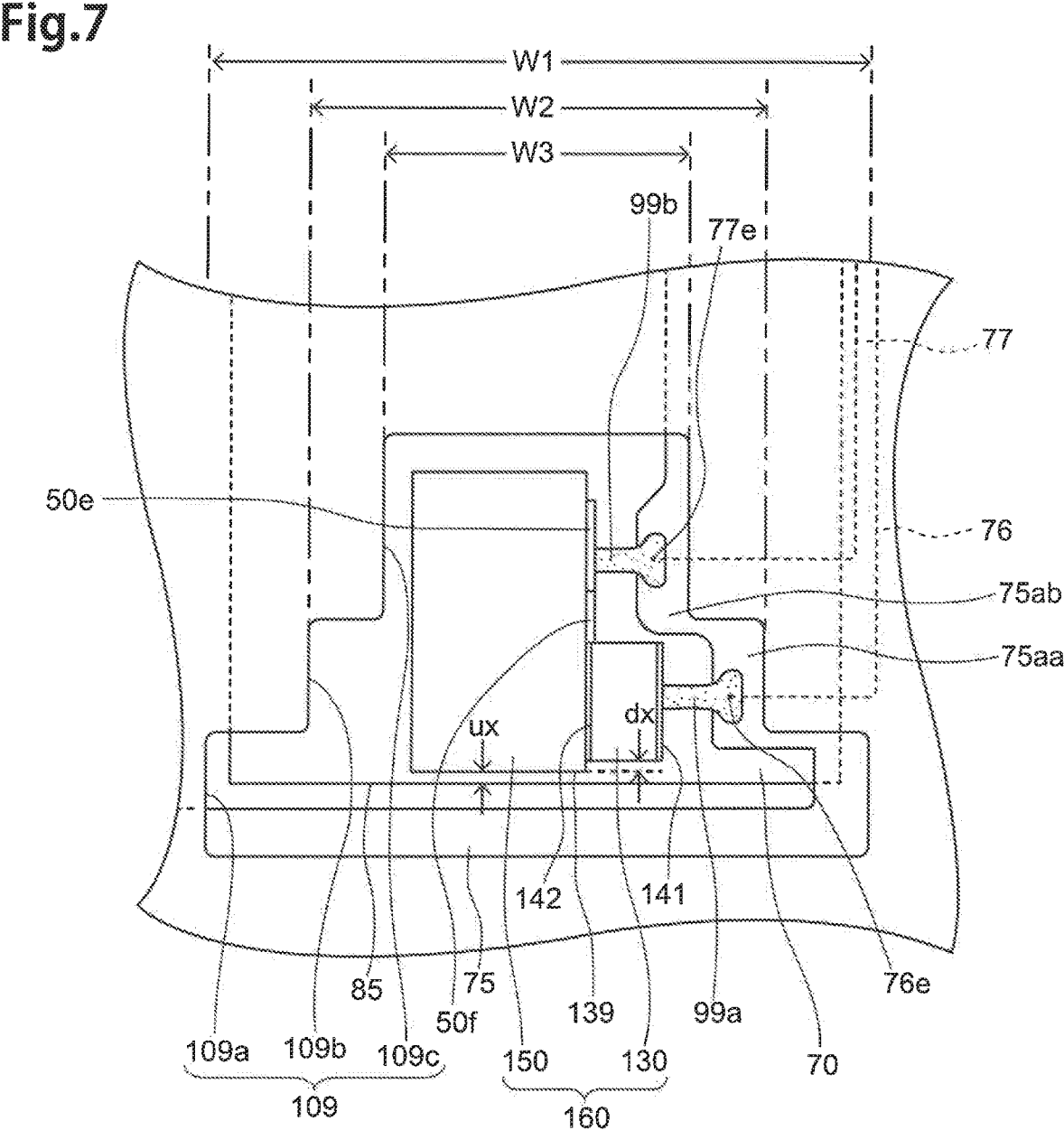
FIG. 7 is a plan view showing a principal part, with enlargement, in FIG. 6.
Figure 8:
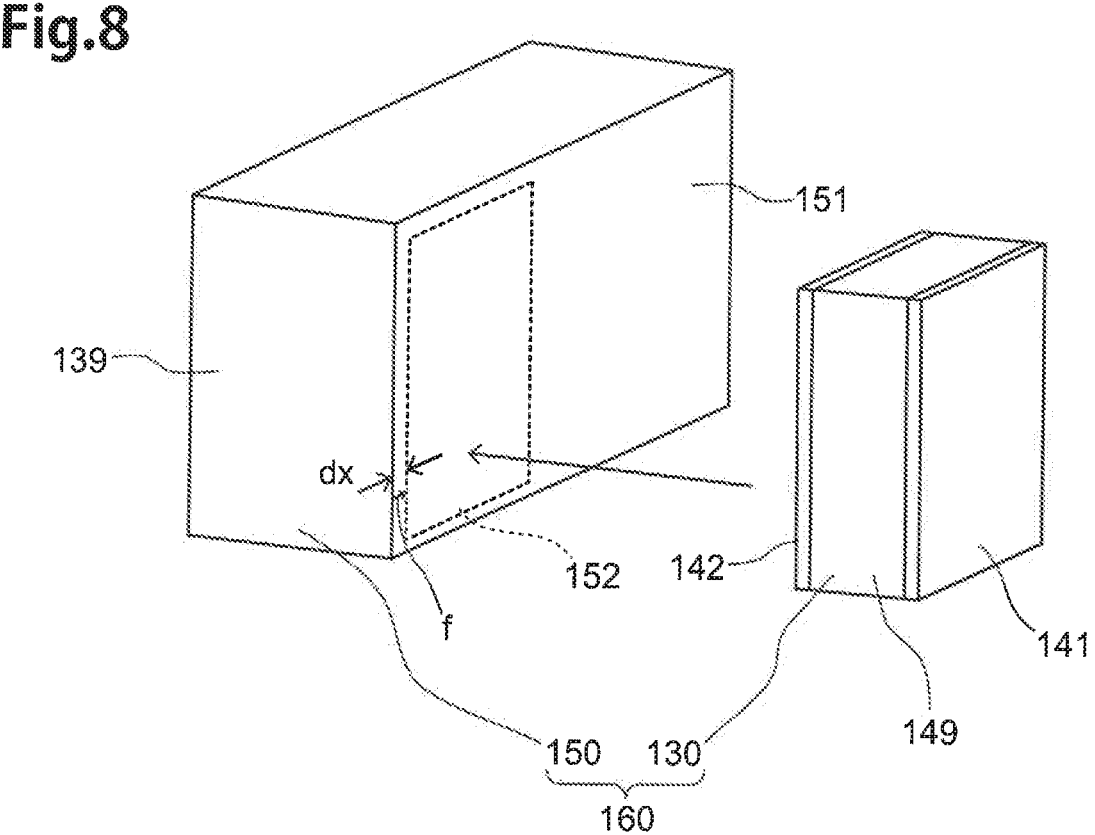
FIG. 8 is an exploded perspective view showing a light source unit which is mounted in the HGA in FIG. 1.
Figure 9:
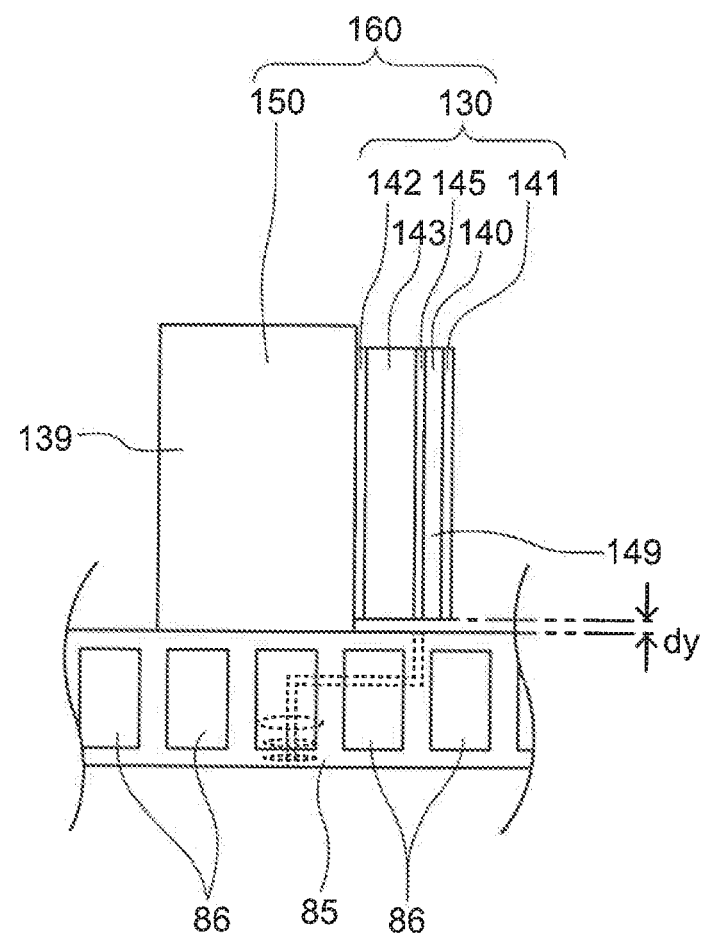
FIG. 9 is a front view showing a principal part of the thermally assisted magnetic head constituting the HGA, in FIG. 1.

To begin with, structure of a HGA 101 according to the embodiment of the present disclosure will be explained with reference to FIG. 1 to FIG. 9. Here, FIG. 1 to FIG. 8 are views showing the HGA 101, a thermally assisted magnetic head 60 according to the embodiment of the present disclosure, FIG. 1 is a perspective view of the whole HGA 101, seen from the front side, FIG. 2 is a perspective view, seen from the front side, of a principal part of the HGA 101, FIG. 3 is a perspective view, seen from the front side, of a principal part of a suspension 50 constituting the HGA 101. Further, FIG. 4 is a perspective view of the thermally assisted magnetic head 60 constituting the HGA 101, FIG. 5 is a sectional view of a principal part, of the HGA 101, which is along with the length direction, FIG. 6 is a perspective view showing the principal part of the HGA 101. Further, FIG. 7 is a plan view showing a principal part, with enlargement, in FIG. 6. FIG. 8 is an exploded perspective view showing a light source unit 160 which is mounted in the HGA 101, FIG. 9 is a front view showing the thermally assisted magnetic head 60.

As illustrated in FIG. 1, the HGA 101 has the suspension 50 and the thermally assisted magnetic head 60. The suspension 50 has a base plate 102, a load beam 103, a flexure 106 and a dumper not illustrated, and it has a structure which these parts are joined to be united one body by a weld and so on.

The base plate 102 is a part which is used to fix the suspension 50 to drive arms 209 of a later-described hard disk drive 201, and it is formed with a metal such as stainless steel or the like.

The load beam 103 is fixed on the base plate 102. The load beam 103 has a shape in which the width gradually decreases as it is distanced more from the base plate 102. The load beam 103 has a load bending part which generates a power for pressing the thermally assisted magnetic head 60 against the hard disk 202 of the hard disk drive 201.

Further, as illustrated in FIG. 2, the flexure 106 has a flexure substrate 104, a wiring member 75, a connecting wiring 111 and thin-film piezoelectric material elements 112a, 112b. The flexure 106 has a structure which the wiring member 75 is formed on the flexure substrate 104, the connecting wiring 111 and thin-film piezoelectric material elements 112a, 112b are adhered on the wiring member 75. Further, a not-illustrated protective insulating layer is formed so as to cover the connecting wiring 111 and thin-film piezoelectric material elements 112a, 112b.

The flexure 106 has piezoelectric elements attached structure which thin-film piezoelectric material elements 112a, 112b are fixed on the surface of the wiring member 75 in addition to the connecting wiring 111 to become a structure with piezoelectric element.

Further, the flexure 106 has a gimbal part 110 on the tip side (load beam 103 side). A tongue part 119, which the thermally assisted magnetic head 60 is mounted, is secured on the gimbal part 110 (see FIG. 3), and a plurality of connecting pads 120 are formed near an edge side than the tongue part 119. Connecting pads 120 are electrically connected to not-illustrated electrode pads of the thermally assisted magnetic head 60, and the connecting pads 120 are formed with solder.

This flexure 106 expands or shrinks thin-film piezoelectric material elements 112a, 112b and expands or shrinks stainless part (referred to out trigger part) jut out outside of the tongue part 119. That makes a position of the thermally assisted magnetic head 60 move very slightly around not-illustrated dimple, and a position of the thermally assisted magnetic head 60 is controlled minutely.

The flexure substrate 104 is a substrate for supporting a whole of the flexure 106, and it is formed with stainless. Rear side of the flexure substrate 104 is fixed to the base plate 102 and the load beam 103 by weld (see FIG. 5, concerning the load beam 103). As illustrated in FIG. 1, the flexure substrate 104 has a center part 104a fixed to surfaces of the load beam 103 and the base plate 102, and a wiring part 104b extending to outside from the base plate 102.

As illustrated in FIG. 5, the wiring member 75 covers surface of the flexure substrate 104. The wiring member 75 forms a later-described slider arrangement surface 50a, of the HGA 101, according to this disclosure. The wiring member 75 is formed with for example polyimide, and it has a thickness of about 5 μm to 10 μm. Further, as illustrated in detail in FIG. 3, a part of the wiring member 75, disposed on the load beam 103, is divided two parts. One part of them is a first wiring part 105a, the other part of them is a second wiring part 105b. The thin-film piezoelectric material elements 112a and thin-film piezoelectric material element 112b are adhered on surfaces of each wiring part. The thin-film piezoelectric material element 112a, 112b are connected to the electrode pads 118a, 118b. The electrode pads 118a, 118b are connected to the connecting wiring 111.

Further, as illustrated in FIG. 5, FIG. 6, the wiring member 75 has an exposed wiring part 75a which is exposed inside a later-described penetrating opening part 109. A connecting pads 76e, 77e, of electrode wirings 76, 77 which are included in the connecting wiring 111, are provided on the exposed wiring part 75a. A later-described LD solder connector 99a, mount solder connector 99b are connected with the respective connecting pads 76e, 77e. Further a plurality of connecting pads 120 are formed on the slider arrangement surface 50a of the wiring member 75. The connecting pads 120 are connected to the connecting wiring 111.

As illustrated in FIG. 3, a plurality of connecting wirings 111 are formed on surfaces of each of the first wiring part 105a and the second wiring part 105b. Each connecting wiring 111 is formed with conductor such as copper or the like. One end part of each connecting wiring 111 is connected with the electrode pads 118a, 118b or each connecting pad 20. The electrode wirings 76, 77 of the connecting wiring 111 are respectively connected with the LD solder connector 99a, mount solder connector 99b.

Then, as illustrated in FIG. 5, the suspension 50 includes the slider arrangement surface 50a and a light source unit arrangement surface 50b. The slider arrangement surface 50a is a surface of the side which a later-described slider 70, of the thermally assisted magnetic head 60, is arranged. The slider arrangement surface 50a is formed with an outside surface of the above-described wiring member 75. The slider 70 is adhered on the slider arrangement surface 50a.

Further, the suspension 50 includes the penetrating opening part 109. The penetrating opening part 109 is a hole part which penetrates from the slider arrangement surface 50a to the light source unit arrangement surface 50b, and it is formed by overlapping of an opening part 75d, an opening part 116, opening part 50d. The opening part 75d, the opening part 116, the opening part 50d are respectively the opening part of the wiring member 75, the opening part of the flexure substrate 104, the opening part of the load beam 103 (note that the load beam 103 is omitted in FIG. 6, for convenience of illustration).

As illustrated in detail in FIG. 7, the penetrating opening part 109 has a three-width structure. The three-width structure means a structure which includes three parts (a later-described first opening part 109a, second opening part 109b and third opening part 109c) having different widths in a direction being along with a later-described slider-front end surface 85 of the thermally assisted magnetic head 60. In the penetrating opening part 109, the first opening part 109a, second opening part 109b, third opening part 109c are arranged in order along with the direction being away from the slider-front end surface 85.

The first opening part 109a, second opening part 109b, third opening part 109c respectively have different widths in a direction being along with the slider-front end surface 85. The first opening part 109a is a part which a part of a later-described magnetic head part 59 of the slider 70 is arranged, and it has a first width W1. The second opening part 109b is a part which a sub-mount 150 and a laser diode 130 of a later described light source unit 160 is arranged. The second opening part 109b is arranged in a position being away from the slider-front end surface 85 than the first opening part 109a, and it has a second width W2, being smaller than the first width W1. The third opening part 109c is a part which the sub-mount 150 of the light source unit 160 is arranged. The third opening part 109c is arranged in a position being away from the slider-front end surface 85 than the second opening part 109b, and it has a third width W3, being smaller than the second width W2 (W1>W2>W3).

Then, the HGA 101 includes an assembly structure. As illustrated in FIG. 5, FIG. 6, the assembly structure is a structure which is constituted by the suspension 50 and the thermally assisted magnetic head 60.

As later described in detail, the thermally assisted magnetic head 60 includes the slider 70 and the light source unit 160. In the HGA 101, concerning the suspension 50 and the thermally assisted magnetic head 60, the light source unit 160 is inserted in the penetrating opening part 109 from the slider arrangement surface 50a and the light source unit 160 is protruded from the light source unit arrangement surface 50b. Moreover, the slider 70 is adhered on the slider arrangement surface 50a of the suspension 50. The structure, which is constituted by the suspension 50 and the thermally assisted magnetic head 60, is the assembly structure.

Further, the HGA 101 includes the LD solder connector 99a and the mount solder connector 99b. The LD solder connector 99a and the mount solder connector 99b are explained in detail as follows.

(LD Solder Connector, Mount Solder Connector 99b)

As illustrated in FIG. 5 to FIG. 7, the LD solder connector 99a is connected with a n-electrode 141 of the later-described laser diode 130 and the connecting pad 76e of the electrode wiring 76. The connecting pad 76e is provided on a later-described LD extending part 75aa of the exposed wiring part 75a, and the n-electrode 141 is arranged so as to face the connecting pad 76e. The n-electrode 141 is connected to the connecting pad 76e with the LD solder connector 99a.

Further, the mount solder connector 99b is connected with an electrode pad 50e of a later-described sub-mount 150 and the connecting pad 77e of the electrode wiring 77. The connecting pad 77e is provided on a later-described mount extending part 75ab of the exposed wiring part 75a, and the electrode pad 50e is arranged so as to face the connecting pad 77e. The electrode pad 50e is connected to the connecting pad 77e with the mount solder connector 99b.

The LD extending part 75aa is a part, of the exposed wiring part 75a, which is extended inside the second opening part 109b. A part of the exposed wiring part 75a is extended toward the laser diode 130, thereby the distance, between the exposed wiring part 75a and the laser diode 130, is narrowed. The extended part is the LD extending part 75aa. The mount extending part 75ab is a part, of the exposed wiring part 75a, which is arranged inside the third opening part 109c, and it is extended toward the sub-mount 150 than the LD extending part 75aa. A part of the exposed wiring part 75a is extended toward the sub-mount 150, thereby the distance, between the exposed wiring part 75a and the sub-mount 150, is narrowed. The extended part is the mount extending part 75ab.

The LD solder connector 99a and the mount solder connector 99b are formed with solder balls in melted-particle condition, for example. In this case, the solder ball is jetted from a not-illustrated jetting apparatus so that the laser diode 130 is connected to the flexure 106, and the solder ball is arranged between the n-electrode 141 and the LD extending part 75aa. The solder ball is in contact with the n-electrode 141 and the LD extending part 75aa, and after that the solder ball harden, thereby the LD solder connector 99a is formed.

Another solder ball is jetted from the not-illustrated jetting apparatus, and it is arranged between the electrode pad 50e and the mount extending part 75ab. The solder ball is in contact with the electrode pad 50e and the mount extending part 75ab, and after that the solder ball harden, thereby the mount solder connector 99b is formed. Note that in the present disclosure, melted-particle condition means condition which melted solder becomes a particle-shaped by a surface tension. The solder ball is a minute granule like member, made of solder, and it has a ball like form (not illustrated).

(Structure of the Thermally Assisted Magnetic Head)

As illustrated in FIG. 4, the thermally assisted magnetic head 60 has the slider 70 and the light source unit 160. The thermally assisted magnetic head 60 has a structure which the light source unit 160 is joined to the slider 70.

The slider 70 has a slider-substrate 58 and a magnetic head part 59 formed on the slider-substrate 58.

The slider-substrate 58 is made of a ceramic material such as aluminum oxide-titanium carbide ($Al_2O_3 \cdot TiC$) or the like, and it is formed in a rectangular parallelepiped shape. The slider-substrate 58 has a medium-opposite surface (Air Bearing Surface, which will hereinafter be referred also to as "ABS") 81 opposite to the magnetic recording medium, a light source placing surface 82 arranged on the opposite side of the ABS 81. A part of the light source placing surface 82 formed in the magnetic head part 59, is defined as a light source-opposite surface 83. The light source-opposite surface 83 is opposite to a later-described laser diode 130 of the light source-unit 160.

The magnetic head part 59 includes the slider-front end surface 85. The magnetic head part 59 includes an electromagnetic coil element 12 which is a recording head for recording magnetic data and a MR device 13 which is a reproducing head for detecting a magnetic signal. The slider-front end surface 85 is connected with the ABS 81 and the light source-opposite surface 83, and it has a width being common with the ABS 81 and the light source-opposite surface 83. Further, a plurality of connecting electrodes 86 are formed on the slider-front end surface 85. The magnetic head part 59 has a structure which the reproducing head and the recording head are stacked. Further, the magnetic head part 59 has a core layer 17 and a near-field light generating layer 28.

The MR device 13 is constituted by a magneto-sensitive film exhibiting a magneto resistive effect, such as AMR (anisotropic magneto resistive), GMR (giant magneto resistive), and TMR (tunneling magneto resistive) devices.

The electromagnetic coil element 12 has a plurality of layers, which is laminated on a thin-film laminated surface 111a of the slider substrate 58, including a recording magnetic layer 12a and a thin-film coil 12b. The thin-film coil 12b is wound like a flat spiral about the recording magnetic layer 12a.

Then, in the electromagnetic coil element 12, when a current, modulated according to magnetic data to be recorded on the magnetic recording medium, flows through the thin-film coil 12b, the current causes the thin-film coil 12b to generate a recording magnetic field. Further, magnetic flux, in accordance with the recording magnetic field, is emitted from the recording magnetic layer 12a to the magnetic recording medium, the magnetic flux flows back to a not-illustrated return magnetic pole layer via the magnetic recording medium (a not-illustrated soft magnetic layer in detail).

The core layer 17 is a wave guide which guides laser light, generated by the later-described laser diode 130 of the light source unit 160, from the light source-opposite surface 83 to the ABS 81.

The core layer 17 is formed with dielectric such as tantalum oxide ($TaO_x$) or the like. For example, the core layer 17 is able to be formed with $Ta_2O_5$ (for example, the refractive index is about 2.16).

The near-field light generating layer 28 generates near-field light for heating the magnetic recording medium. The near-field light generating layer 28 is made of metal and formed of, for example, one of Au, Ag, Al, Cu, Pd, Pt, Rh, Ir or an alloy made of a plurality of those elements.

(Light Source Unit)

As illustrated in FIG. 4 to FIG. 6, the light source unit 160 includes the laser diode 130 and the sub-mount 150. The laser diode 130 is joined to the sub-mount 150 to constitute the light source unit 160.

The laser diode 130 has a rectangular parallelepiped shape. The laser diode 130 is the TE mode LD which emits laser light with TE mode. The laser diode 130 includes an electrode surface (n-electrode 141) and a LD-front end surface 149. The LD-front end surface 149 intersects with the electrode surface (a later-described n-electrode 141) orthogonally, and it is arranged in a direction along a later described mount-front end surface 139. Both the LD-front end surface 149 and the electrode surface (n-electrode 141) are formed in a rectangular shape.

As illustrated in FIG. 9, the laser diode 130 includes an n-substrate 140, the n-electrode 141, a light emitting layer 145, and a p-electrode 142. The n-electrode 141 is joined to a surface on the outside of the n-substrate 140. Further, the light emitting layer 145 is formed on a side of the n-substrate 140 opposite to the n-electrode 141, and the p-electrode 142 is joined on the light emitting layer 145, via a ground layer 143.

The light emitting layer 145 has an active layer, an n-cladding layer, and a p-cladding layer, and has a structure in which the active layer is sandwiched between the n-cladding layer and the p-cladding layer.

Then, the laser diode 130 is joined to the sub-mount 150 so that the active layer opposes to the core layer 17 and a not-illustrated emission part is arranged in a part, opposing to the core layer 17, of the light emitting layer 145, thereby the light source unit 160 is constituted. The light source unit 160 is mounted on the light source placing surface 82. The emitting part is a part, of the laser diode 130, which emits the laser light.

The sub-mount 150 is made of a ceramic material such as aluminum oxide-titanium carbide ($Al_2O_3 \cdot TiC$) or the like, and it is formed in a rectangular parallelepiped shape. The sub-mount 150 has a size larger than the laser diode 130. Further, the sub-mount 150 is able to be formed with semiconductor material such as Si, GaAs, SiC or the like.

As illustrated in FIG. 4, FIG. 6, FIG. 7, the sub-mount 150 includes a joined-end surface 151, which the laser diode 130 is joined, and the mount-front end surface 139. An electrode pads 50e is formed on the joined-end surface 151. The electrode pads 50e is connected with a mount wiring 50f. The mount wiring 50f is connected with the p-electrode 142 of the laser diode 130. The mount-front end surface 139 intersects orthogonally with the joined-end surface 151. The mount-front end surface 139 is arranged in a direction along with the slider-front end surface 85, in the light source unit 160. Both the mount-front end surface 139 and the joined-end surface 151 are formed in a rectangular shape.

Then the light source unit 160 includes a shift joined structure. The shift joined structure means a structure which the laser diode 130 is joined in a shift area 152 of the joined-end surface 151. As illustrated in FIG. 6 to FIG. 8, the shift area 152 is set in a position which is shifted with a certain shift size dx than the mount-front end surface 139 in a direction (direction f, illustrated in FIG. 8) being away from the slider-front end surface 85. The shift size dx is able to be set in 10 μm to 20 μm, for example. The shift area 152 has a size being corresponding to the p-electrode 142 (electrode bottom surface). As illustrated in FIG. 7, because the light source unit 160 includes the shift joined structure, the laser diode 130 is receding with the shift size dx than the sub-mount 150.

As illustrated in FIG. 4, the sub-mount 150 of the light source unit 160, having the above-described structure, is joined to the slider 70 to constitute the thermally assisted magnetic head 60.

Further, as illustrated in FIG. 4, in the thermally assisted magnetic head 60, the light source-unit 160 is mounted on the light source placing surface 82 so that the electrode surface (n-electrode 141) of the laser diode 130 intersects orthogonally with the laminated surfaces 59a, 59b (for example thin-film laminated surface 111a, core layer 17, and so on) of the magnetic head part 59. Besides, as illustrated in FIG. 7, a unit gap ux is ensured between the mount-front end surface 139 and the slider-front end surface 85. The laser diode 130, being the TE mode LD, and the sub-mount 150 are placed on the slider 70 so as to be arranged in a row along with the side surface (slider-front end surface 85) of the slider 70. Therefore, the thermally assisted magnetic head 60 includes the transverse placing structure concerning the laser diode 130 and the sub-mount 150. Note that parts of the laser diode 130 and the sub-mount 150 are arranged on the magnetic head part 59, in the structure which the light source unit 160 is placed on the light source placing surface 82.

(Light Source Unit Bar Like Member and Method of Manufacturing the Light Source Unit Bar Like Member)

Next, a light source unit bar like member (hereinafter, referred to also as a "LSU bar like member") 169 and method of manufacturing the LSU bar like member 169 will be explained.

Figure 11:
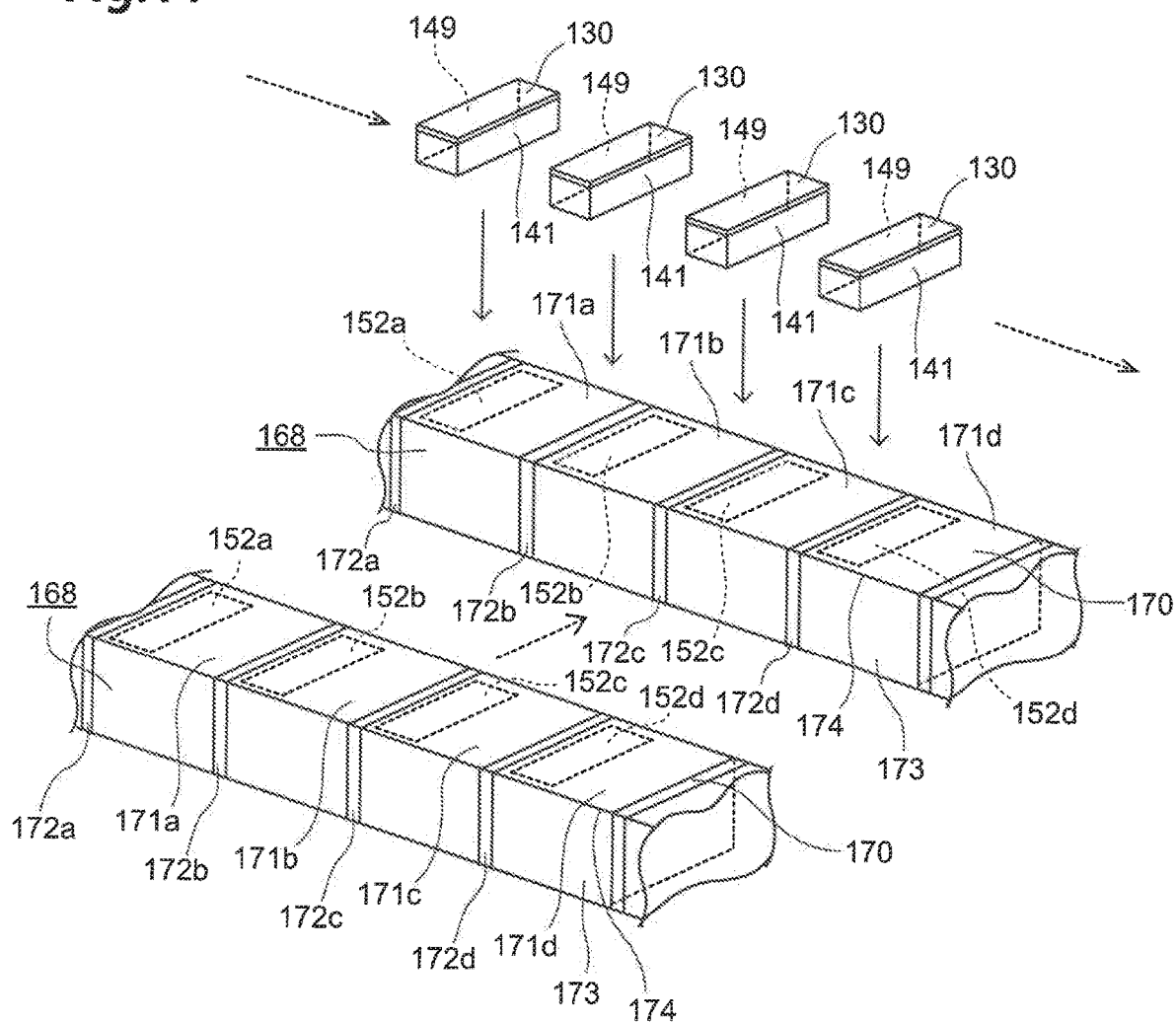
FIG. 11 is an exploded perspective view showing a plurality of bar like members, which are manufactured from the silicon wafer in FIG. 10, in addition with laser diodes.
Figure 12:
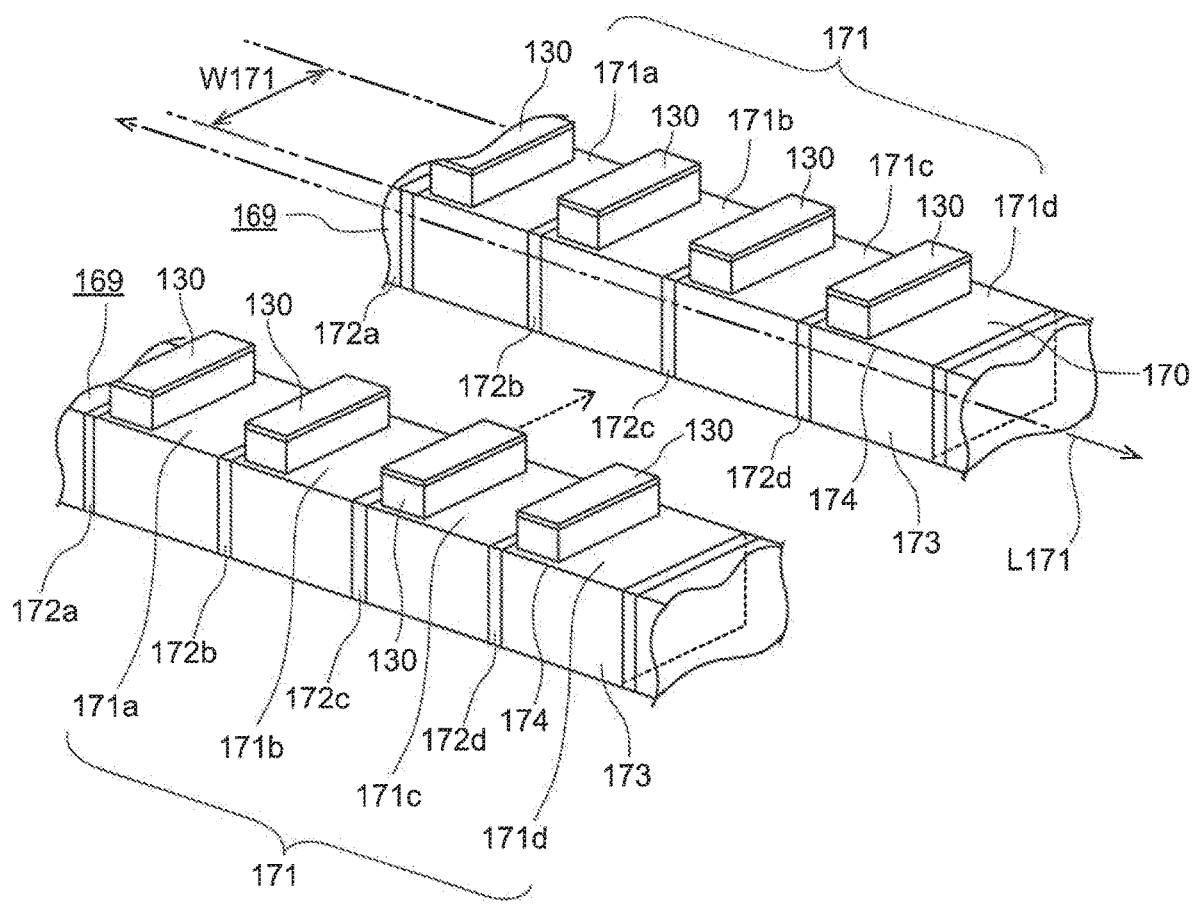
FIG. 12 is a perspective view, partly omitted, showing a light source unit bar like member.
Figure 13:
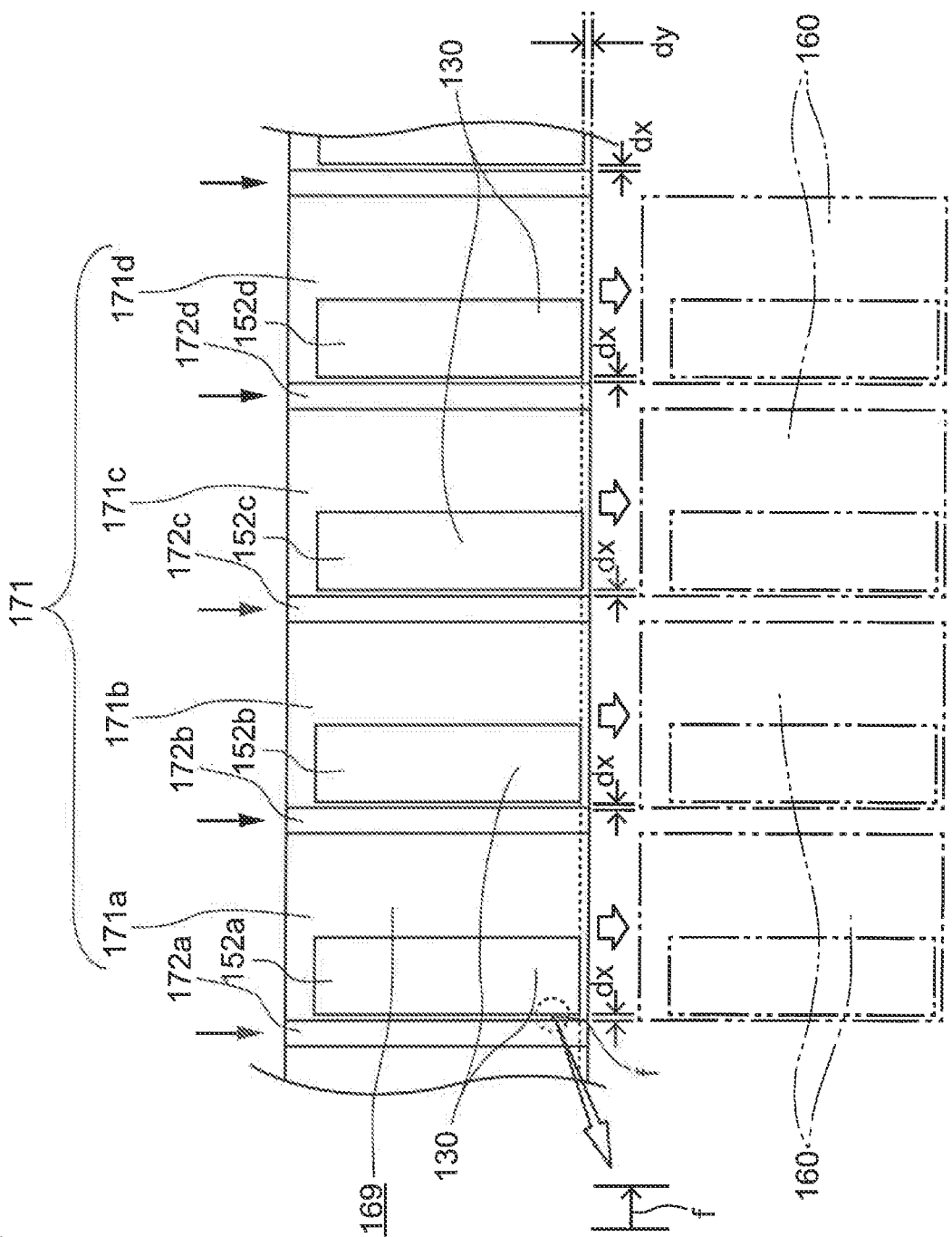
FIG. 13 is a plan view, partly omitted, showing the light source unit bar like member and the light source unit.

The LSU bar like member 169 is a member which is used for manufacturing the above-described light source unit 160, and it includes a plurality of light source-units 160. As illustrated in FIG. 11 to FIG. 13, the LSU bar like member 169 includes a bar like member 168 and a plurality of laser diodes 130.

The bar like member 168 is a member having a length L171 which is greatly larger than a width W171, and it is a long-bar like member, as a whole, having a straight line like form. The bar like member 168 includes a plurality of mount parts 171 (171a, 171b, 171c, 171d . . . ). The respective mount parts 171 are arranged being separated by scribe lines 172 (172a, 172b, 172c, 172d . . . ). Further, the bar like member 168 includes long-bar like surfaces which are formed by united one surface of a plurality of mount parts 171 (171a, 171b, 171c, 171d . . . ) and scribe lines 172 (172a, 172b, 172c, 172d . . . ). The bar like member 168 includes four long-bar like surfaces, one of them is a long-bar like joined surface 170, another one of them is a long-bar like front end surface 173. In the bar like member 168, a structure, which a plurality of mount parts 171 and scribe lines 172 form the long-bar like joined surface 170 and the long-bar like front end surface 173, means a mount-line structure, according to the disclosure.

The long-bar like joined surface 170 is a flat surface which a plurality of laser diodes 130 are arranged. The long-bar like front end surface 173 is also a flat surface which is arranged intersecting orthogonally with the long-bar like joined surface 170. The laser diodes 130 respectively arranged on the respective mount parts 171 (171a, 171b, 171c, 171d . . . ) one by one, in the long-bar like joined surface 170.

Then, the LSU bar like member 169 includes a line-like shift-joined structure. As illustrated in FIG. 11, when the respective laser diodes 130 are joined to the respective mount parts 171 (171a, 171b, 171c, 171d . . . ), the respective laser diodes 130 are joined to the respective shift areas 152 (152a, 152b, 152c, 152d . . . ) so that the respective LD-front end surfaces 149 of the respective laser diodes 130 are arranged along the respective scribe lines 172 (172a, 172b, 172c, 172d . . . ). As illustrated in FIG. 13, the shift areas 152 (152a, 152b, 152c, 152d . . . ) are shifted from the respective scribe lines 172 (172a, 172b, 172c, 172d . . . ), in the certain shift size dx, as similar with the light source unit 160. As illustrated in FIG. 12, FIG. 13, a plurality of laser diodes 130 are joined to the shift areas 152 (152a, 152b, 152c, 152d . . . ) one by one, thereby the laser diodes 130 are arranged in a straight-line-like form, the structure is the line-like shift-joined structure.

In the LSU bar like member 169, the shift areas 152 (152a, 152b, 152c, 152d . . . ) are set in the sifted positions with the certain sift size dx in a direction being away from the respective scribe lines 172 (172a, 172b, 172c, 172d . . . ) of the long-bar like joined surface 170, concerning all mount parts 171 (171a, 171b, 171c, 171d . . . ) included in the bar like member 168. The shift areas 152 (152a, 152b, 152c, 152d . . . ) are also set in the sifted positions with an LD gap dy from an edge line 174. The edge line 174 is a straight line like corner part where the long-bar like joined surface 170 and long-bar like front end surface 173 are intersecting with each other.

Then, as illustrated in FIG. 13, when a cutting step is performed about the LSU bar like member 169, including the above structure, the light source units 160 are manufactured from the respective mount parts 171. In the cutting step, the LSU bar like member 169 is cur along with the respective scribe lines 172 (172a, 172b, 172c, 172d . . . ) using a not-illustrated blade.

Subsequently, the method of manufacturing the LSU bar like member 169 is explained as follows.

Figure 10:
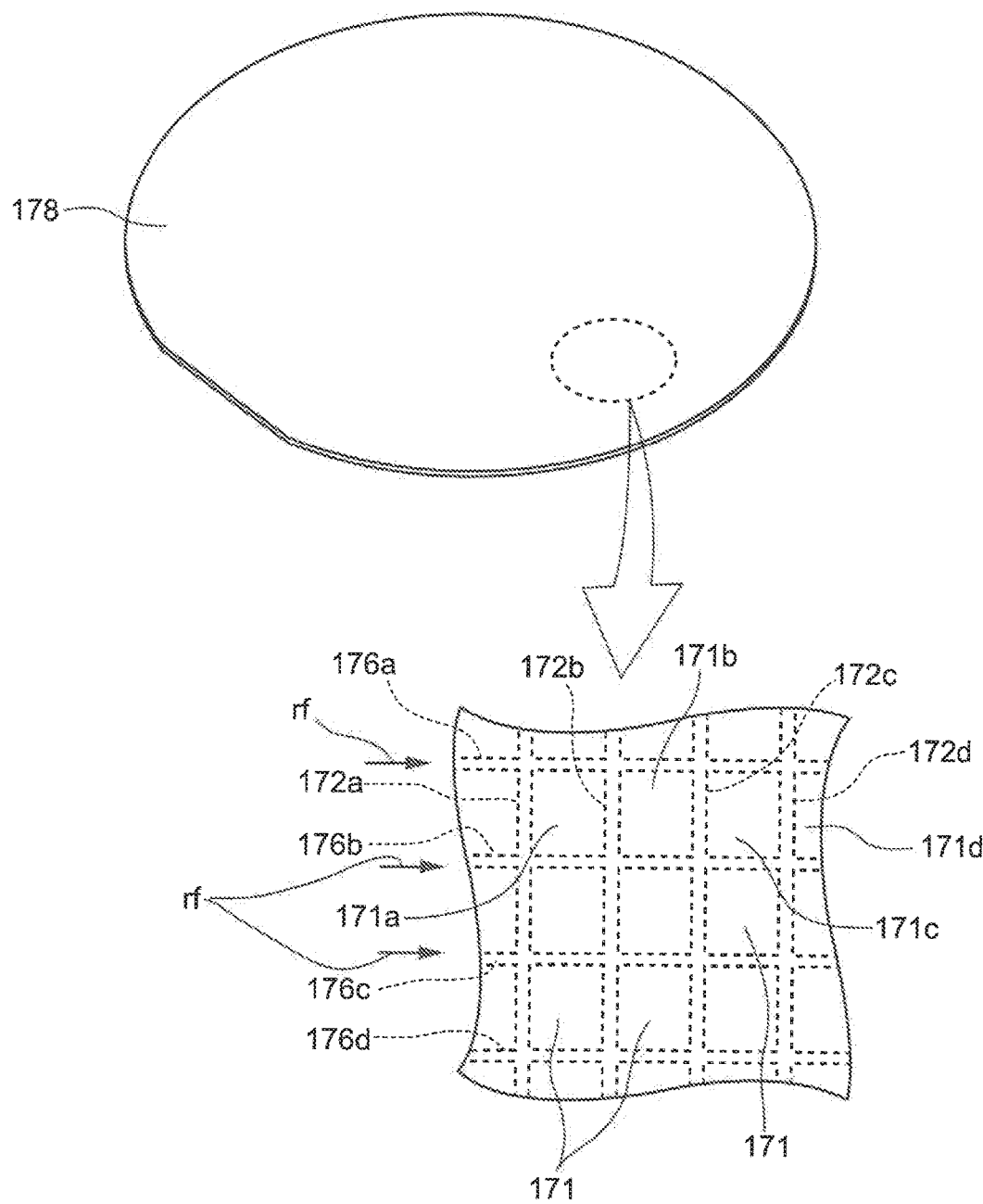
FIG. 10 is a perspective view showing an entirety of the silicon wafer which is used for manufacturing a bar like member.

To begin with, a preparation step is performed. As illustrated in FIG. 10, in the preparation step, a silicon wafer 178 and a plurality of laser diodes 130 are prepared (the laser diodes are not illustrated in FIG. 10).

The silicon wafer 178 is a substrate (sub-mount substrate) being used for manufacturing the sub-mounts 150. A plurality of mount parts 171, including mount parts 171a, 171b, 171c, 171d, are arranged in a grid like form intervening the scribe lines 172 (172a, 172b, 172c, 172d . . . ) and the scribe lines 176 (176a, 176b, 176c, 176d . . . ). Note that the scribe lines 172 (172a, 172b, 172c, 172d . . . ) are longitudinal scribe lines, the scribe lines 176 (176a, 176b, 176c, 176d . . . ) are horizontal scribe lines, in FIG. 10. The scribe lines 172 (172a, 172b, 172c, 172d . . . ) and the scribe lines 176 (176a, 176b, 176c, 176d . . . ) are formed so as to intersect orthogonally.

Next, a bar like member forming step is performed. In the bar like member forming step, the silicon wafer 178 is cut along with one of the scribe lines 172 or the scribe lines 176 in a fixed direction (longitudinal direction or horizontal direction) using a not illustrated blade. Here, in consideration of relationship with FIG. 11, the silicon wafer 178 is cut along with (allow rf in FIG. 11) the scribe lines 176 (176a, 176b, 176c, 176d . . . ). Just then, a plurality of bar like members 168 are formed. A plurality of mount parts 171 (171a, 171b, 171c, 171d . . . ) are arranged along with the scribe lines 176 (176a, 176b, 176c, 176d . . . ) in the respective bar like members 168 which are formed in the above. Further, the bar like members 168 respectively include four long-bar like surfaces. One of the long-bar like surfaces is the above-described long-bar like joined surface 170, the other one is the long-bar like front end surface 173.

Subsequently, a shift area setting step is performed. As illustrated in FIG. 11, in the shift area setting step, concerning the mount parts 171 (171a, 171b, 171c, 171d . . . ) of the respective bar like members 168, shift areas 152 (152a, 152b, 152c, 152d . . . ) are set. As illustrated in FIG. 13, the shift areas 152 (152a, 152b, 152c, 152d . . . ) are set in positions which are shifted, with the certain shift size dx, in a direction being away from the respective scribe lines 172 (172a, 172b, 172c, 172d . . . ).

Next, a laser diode joining step is performed. In the laser diode joining step, the laser diodes 130 are respectively joined to the respective mount parts 171 (171a, 171b, 171c, 171d . . . ) of the respective bar like members 168. At this time, the laser diodes 130 are respectively joined to the shift areas 152 (152a, 152b, 152c, 152d . . . ) of the respective mount parts 171 (171a, 171b, 171c, 171d . . . ). After the laser diode joining step is performed, the above-described LSU bar like members 169 are manufactured.

Subsequently, the method of manufacturing the thermally assisted magnetic head 60 including the above structure is explained as follows.

Figure 14:
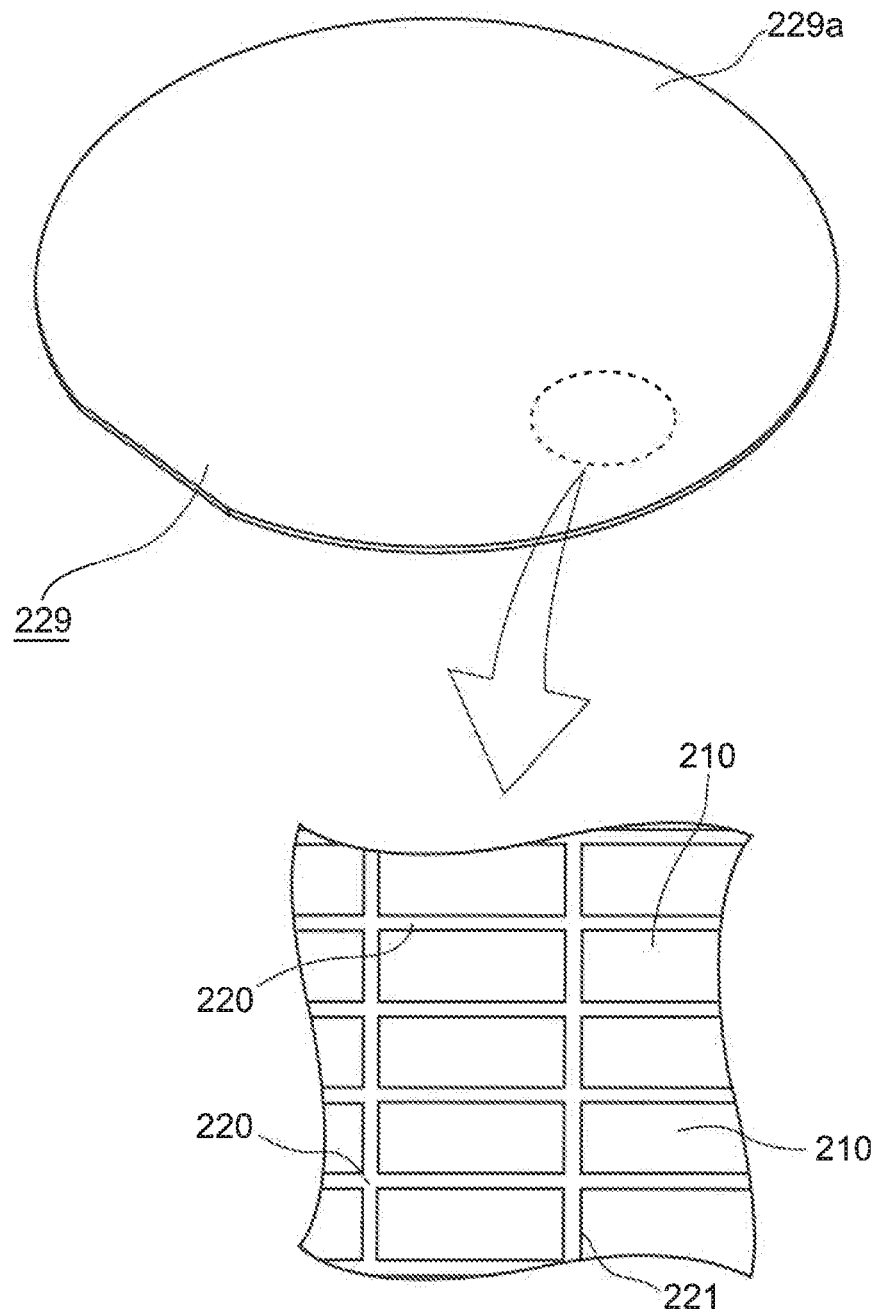
FIG. 14 is a perspective view showing an entirety of a wafer like substrate which is used for manufacturing the thermally assisted magnetic head.

To begin with, as illustrated in FIG. 14, a wafer like substrate 229 is prepared. The wafer like substrate 229 is formed with a ceramic material such as aluminum oxide-titanium carbide ($Al_2O_3 \cdot TiC$) or the like. Scribe lines 220 and 221 are formed on a first surface 229a of the wafer like substrate 229. A plurality of the scribe lines 220 and 221 are formed on the first surface 229a respectively and formed on straight lines at predetermined intervals along fixed directions. The scribe lines 220 are orthogonal to the scribe lines 221. A plurality of regions surrounded with the respective scribe lines 220, 221 are slider regions 210. The slider 70 is formed from each slider region 210.

Next, a thin-film forming process is performed concerning the first surface 229a, and thereby the thin magnetic head parts 59 are formed in the respective slider regions 210.

Figure 15:
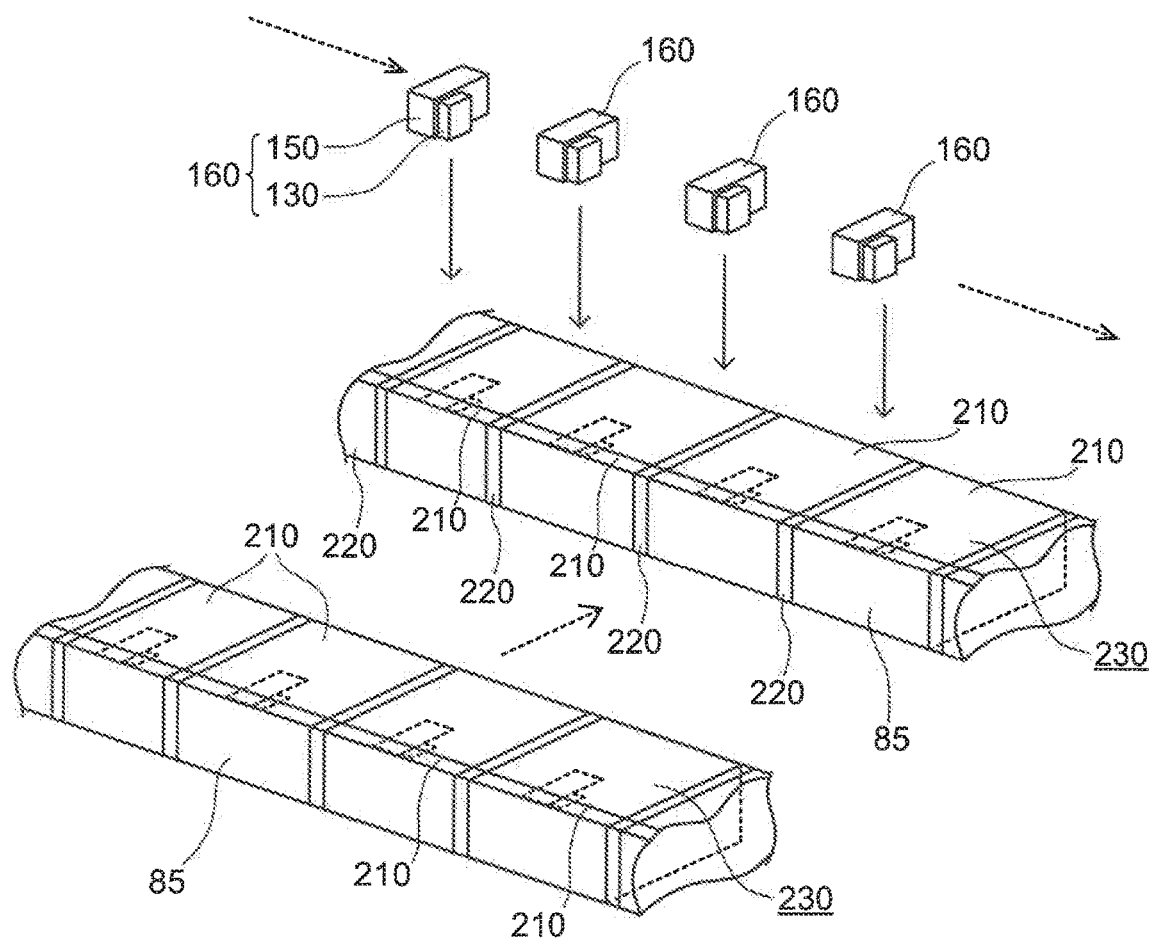
FIG. 15 is an exploded perspective view showing a plurality of bar like members, which are manufactured from the wafer like substrate in FIG. 14, in addition with the light source units.

Next, a bar like member forming step is performed. In the bar like member forming step, the wafer like substrate 229 is cut along with the scribe lines 221. Thereby, a plurality of bar like members 230 are formed, as illustrated in FIG. 15. A plurality of slider region 210 are included in the bar like member 230. The respective slider regions 210 are divided by scribe lines 220. Further, the bar like member forming step is performed to form the slider-front end surfaces 85, in the respective slider regions 210.

Subsequently, a light source unit mounting step is performed. In the light source unit mounting step, a plurality of light source units 160 are used. Because, the plurality of light source units 160 are manufactured with the above-described LSU bar like member 169, the respective light source units 160 include the above-described shift joined structures.

Figure 16:
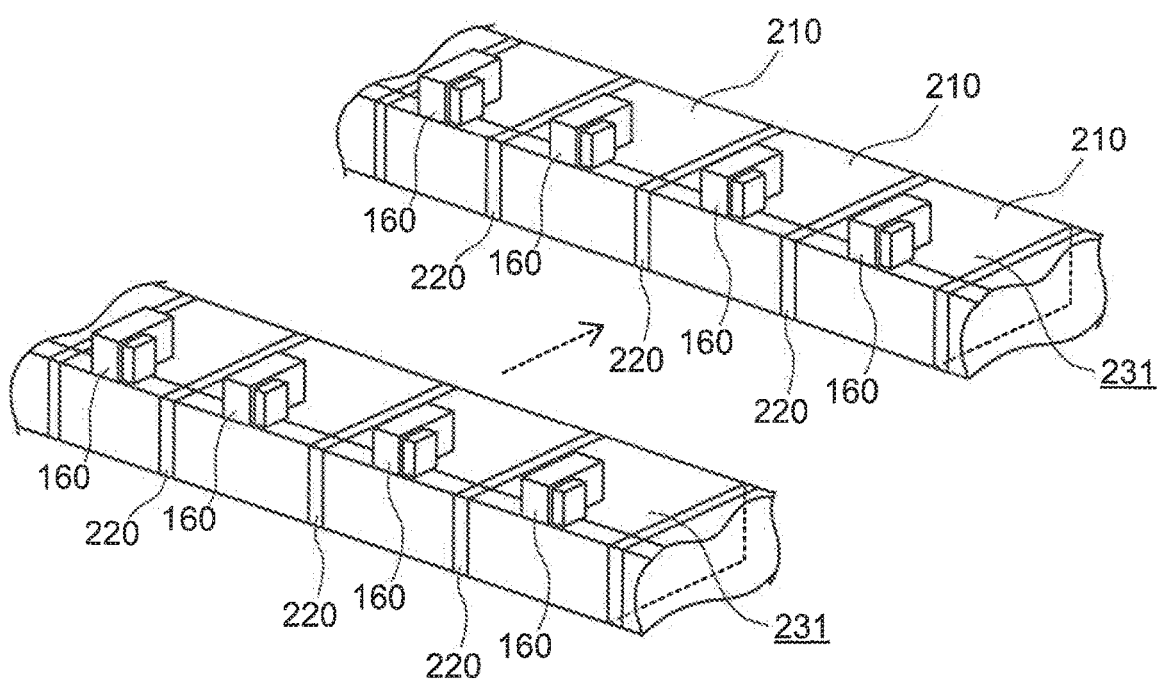
FIG. 16 is a perspective view, partly omitted, showing a magnetic head bar like member.

Then, the light source unit mounting step, as illustrated in FIG. 15, the light source-units 160 are respectively mounted on the respective slider regions 210. In this case, the light source-units 160 are respectively placed on the light source placing surfaces 82 so that the electrode surfaces (n-electrode 141) of the laser diodes 130 intersect orthogonally with the laminated surfaces of the magnetic head parts 59 (the magnetic head part 59, light source placing surfaces 82 are not illustrated in FIG. 15.) Besides, at the occasion, the light source-units 160 are respectively positioned and mounted on the respective slider regions 210 so that the active layers of the laser diodes 130 oppose to the core layers 17, and the not-illustrated emission parts are arranged in the parts, opposing to the core layer 17, of the light emitting layers 145. At this time, parts of the laser diodes 130 and the sub-mounts 150 are arranged on the magnetic head parts 59. Further, concerning the respective light source-units 160, the unit gap ux is ensured (unit gap is not illustrated in FIG. 16). As illustrated in FIG. 16, after the light source unit mounting step is performed, a magnetic head bar like member (referred also to as "MH bar like member") 231 is manufactured. After that, connecting pads 120 are formed. More after that, when the cutting step is performed along with the scribe lines 220, concerning the MH bar like member 231, the thermally assisted magnetic heads 60 are manufactured from the respective slider regions 210.

Modified Example 1

Figure 17:
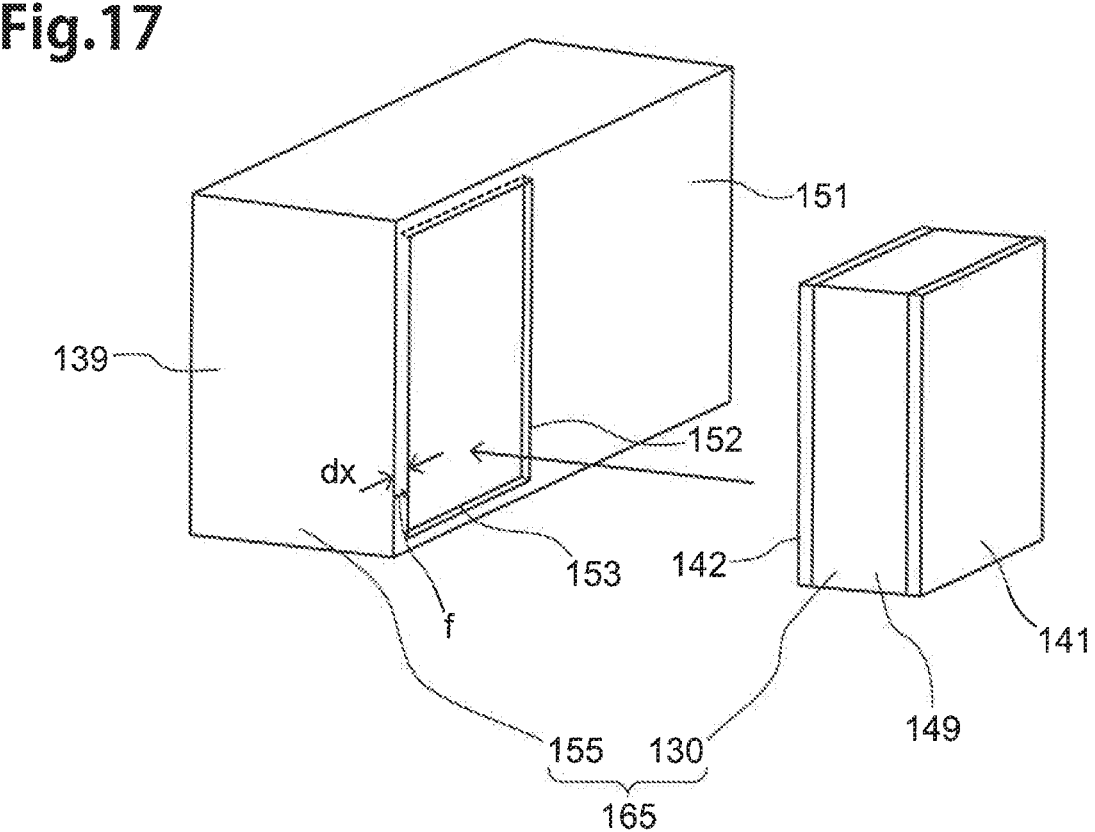
FIG. 17 is an exploded perspective view showing the light source unit according to a modified embodiment 1.
Figure 18:
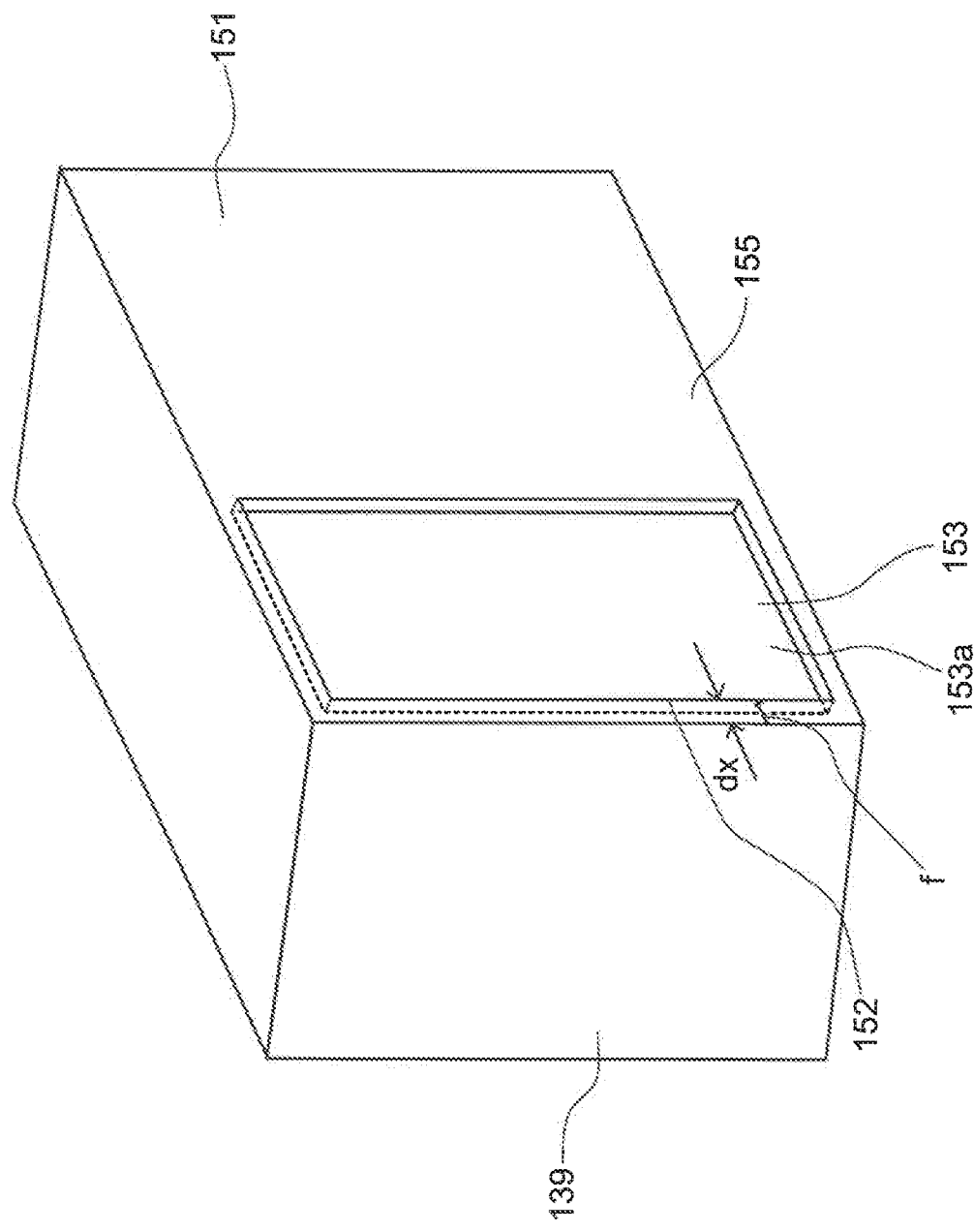
FIG. 18 is a perspective view showing the sub-mount constituting the light source unit, in FIG. 17.

Subsequently, a light source unit 165, according to the modified example 1, is explained. FIG. 17 is an exploded perspective view showing the light source unit 165, FIG. 18 is a perspective view showing a sub-mount 155. The light source unit 165 is different in that it has the sub-mount 155 instead of the sub-mount 150, as compared with the light source unit 160. The sub-mount 155 is different in that it includes a shift cavity 153, as compared with the sub-mount 150. The shift cavity 153 is corresponding to a shift concave part according to this disclosure. The shift cavity 153 is formed in the shift area 152 on the joined-end surface 151 of the sub-mount 155. The shift cavity 153 is a concavity having a bottom part 153a and sharrow depth being larger than the size of the p-electrode 142 (electrode bottom surface) of the laser diode 130.

In the light source unit 165, the p-electrode 142 (electrode bottom surface) is fit into the shift cavity 153, and the laser diode 130 is joined to the sub-mount 155 using a solder layer 199.

Figure 20:
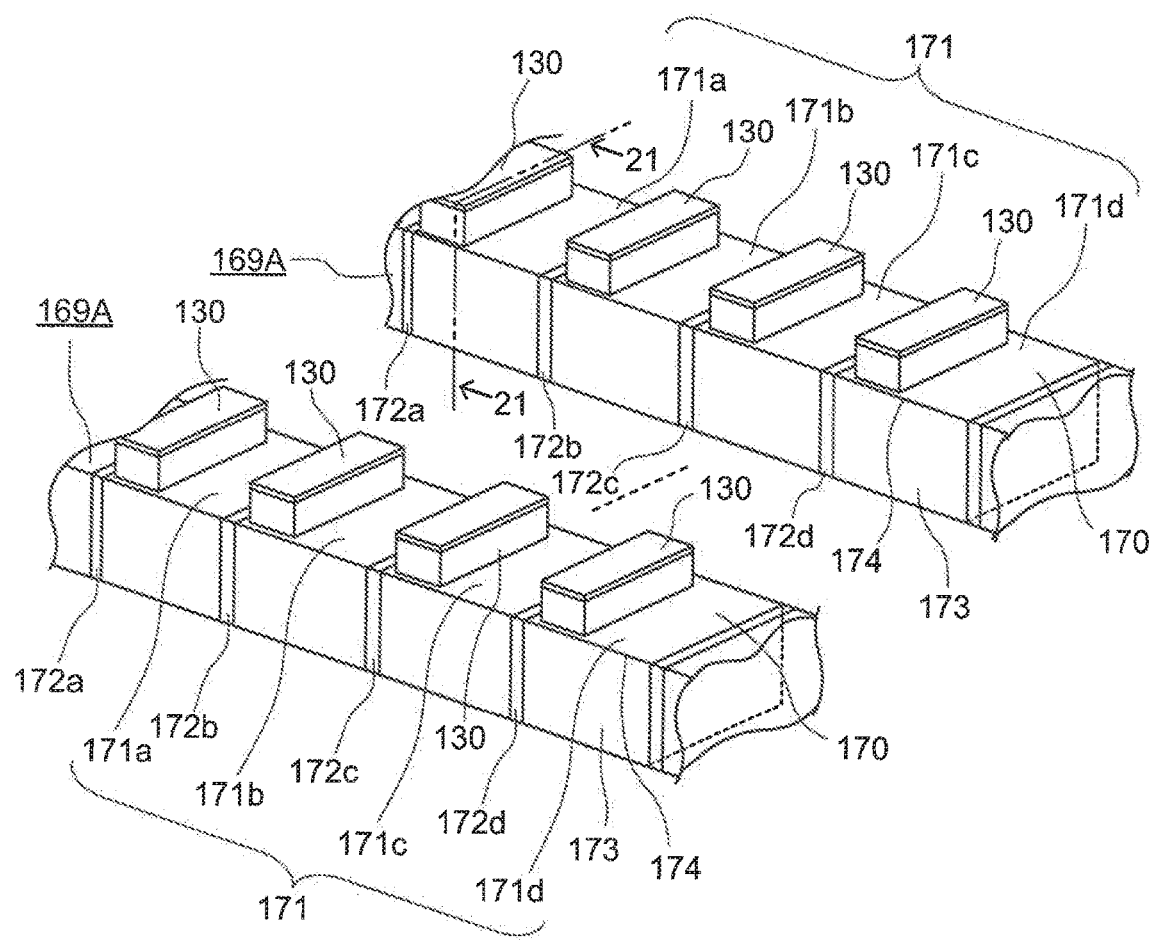
FIG. 20 is a perspective view, partly omitted, showing the light source unit bar like member including the light source unit according to the modified embodiment 1.
Figure 21:
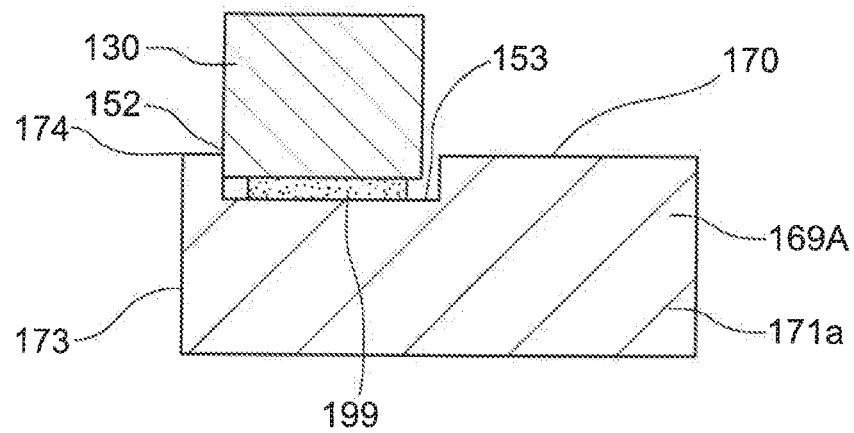
FIG. 21 is a sectional view taken along the line 21-21 in FIG. 20.

Then, the light source unit 165 is manufactured with an LSU bar like member 169A. As illustrated in FIG. 20, 21, the LSU bar like member 169A is different in that it has the shift cavities 153 in the respective mount parts 171 (171a, 171b, 171c, 171d . . . ). Further, manufacturing step for manufacturing the LSU bar like member 169A is different in that a shift cavity forming step is performed as compared with the manufacturing step of the LSU bar like member 169. In the shift cavity forming step, for example, the shift cavities 153 are formed in the respective mount parts 171 (171a, 171b, 171c, 171d . . . ) by etching. At this time, as illustrated in FIG. 21, the shift cavities 153 has the depth which is larger than the thickness of the solder layer 199.

Modified Example 2

Figure 19:
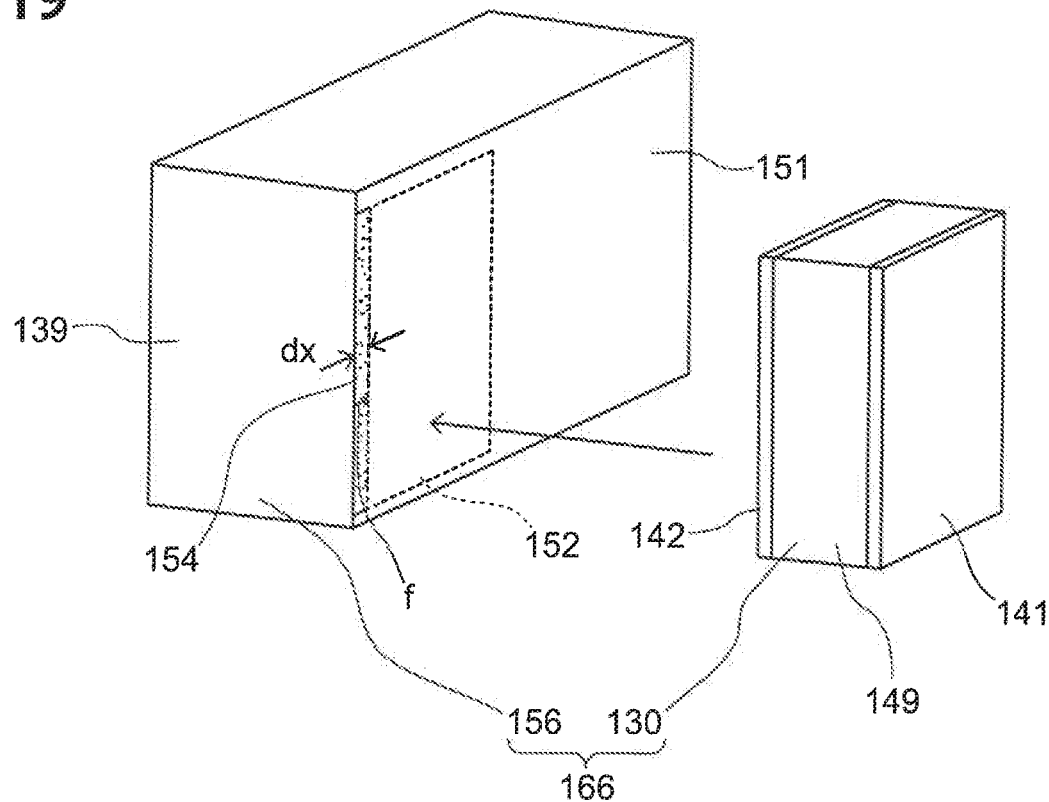
FIG. 19 is an exploded perspective view showing the light source unit according to a modified embodiment 2.

Subsequently, a light source unit 166, according to the modified example 2, is explained. FIG. 19 is an exploded perspective view showing the light source unit 166, according to the modified example 2. The light source unit 166 is different in that it has a sub-mount 156 instead of the sub-mount 150, as compared with the light source unit 160. The sub-mount 156 is different in that it includes a positioning stopper 154, as compared with the sub-mount 150.

The positioning stopper 154 is formed with $Al_2O_3$, $SiO_2$, $TiO_2$, $Zr_2O_3$, or metal material such as Au, Ti, Si, Ni, NiFe and so on. The positioning stopper 154 is formed in a band-like form in a plan view, and it is formed between the shift area 152 of the joined-end surface 151 and the mount-front end surface 139. Further, the positioning stopper 154 is protruded a little from the joined-end surface 151, and it is formed convexly having a certain thickness.

Figure 23:
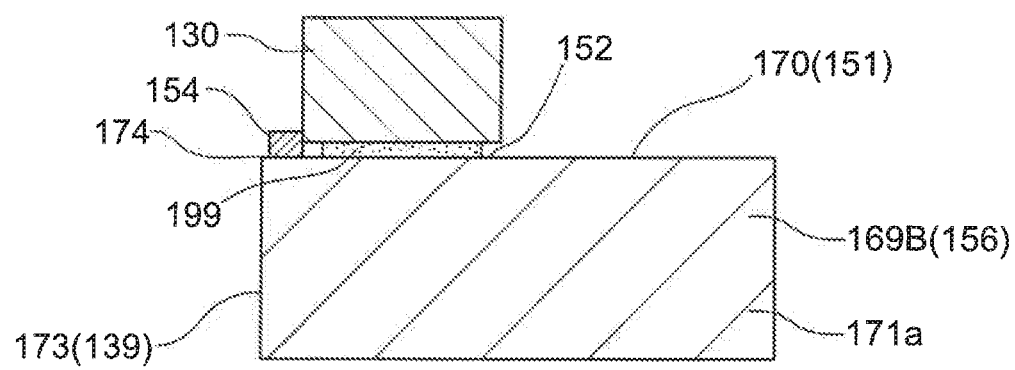
FIG. 23 is a sectional view taken along the line 23-23 in FIG. 22.
Figure 24:
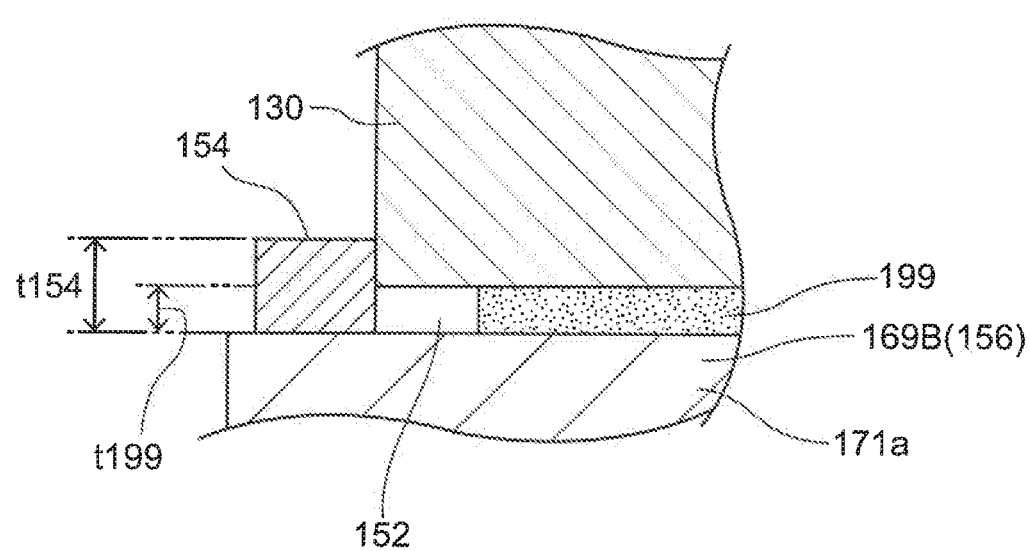
FIG. 24 is a sectional view showing, with enlargement, a principal part in FIG. 23.

In the light source unit 166, as illustrated in FIG. 19, when the laser diode 130 is joined to the sub-mount 156, the solder layer 199 is used. Then, the bottom surface of the laser diode 130 (p-electrode 142) is away from the joined-end surface 151. Therefore, as illustrated in FIG. 23, FIG. 24, the positioning stopper 154 may be formed with the thickness which is larger than the thickness of the solder layer 199. Namely, the thickness t154 of the positioning stopper 154 may be larger than the thickness t199 of the solder layer 199 (t154>t199). For example, when the t199 may be 1-1.5 µm, the t154 may be 2-2.5 µm.

Because the light source unit 166 includes the positioning stopper 154, the laser diode 130 is joined to the shift area 152 being regulated its position by the positioning stopper 154 so that the shift size dx is secured from the mount-front end surface 139.

Figure 22:
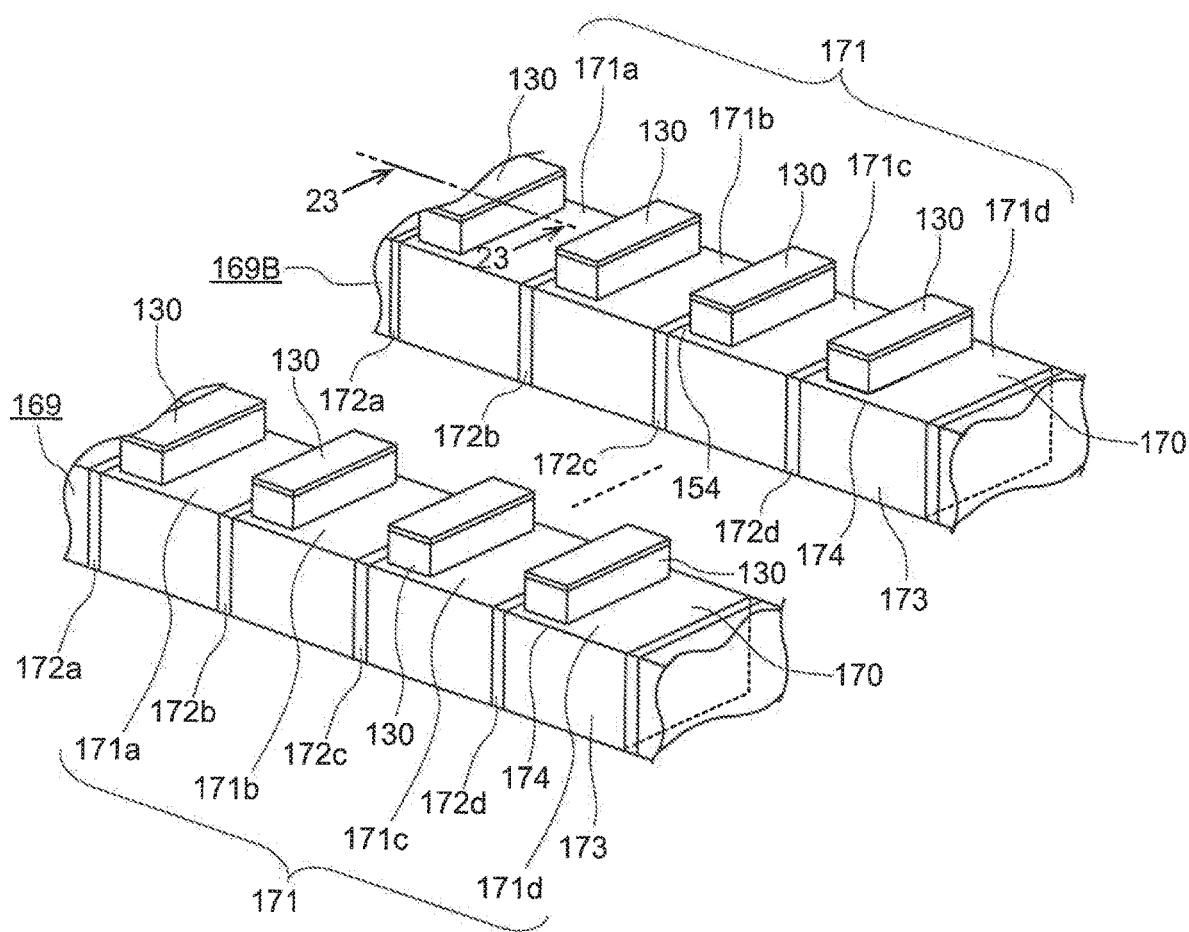
FIG. 22 is a perspective view, partly omitted, showing the light source unit bar like member including the light source unit according to the modified embodiment 2.

Then, the light source unit 166 is manufactured with an LSU bar like member 169B. As illustrated in FIG. 22, 23, the LSU bar like member 169B is different in that it has the positioning stoppers 154 in the respective mount parts 171 (171a, 171b, 171c, 171d . . . ). Further, manufacturing step for manufacturing the LSU bar like member 169B is different in that a positioning stopper forming step is performed as compared with the manufacturing step of the LSU bar like member 169. In the positioning stopper forming step, the positioning stoppers 154 are formed in the positions between the respective shift areas 152 (152a, 152b, 152c, 152d . . . ) and the respective scribe lines 172 (172a, 172b, 172c, 172d . . . ), in the respective mount parts 171 (171a, 171b, 171c, 171d . . . ).

Figure 25:
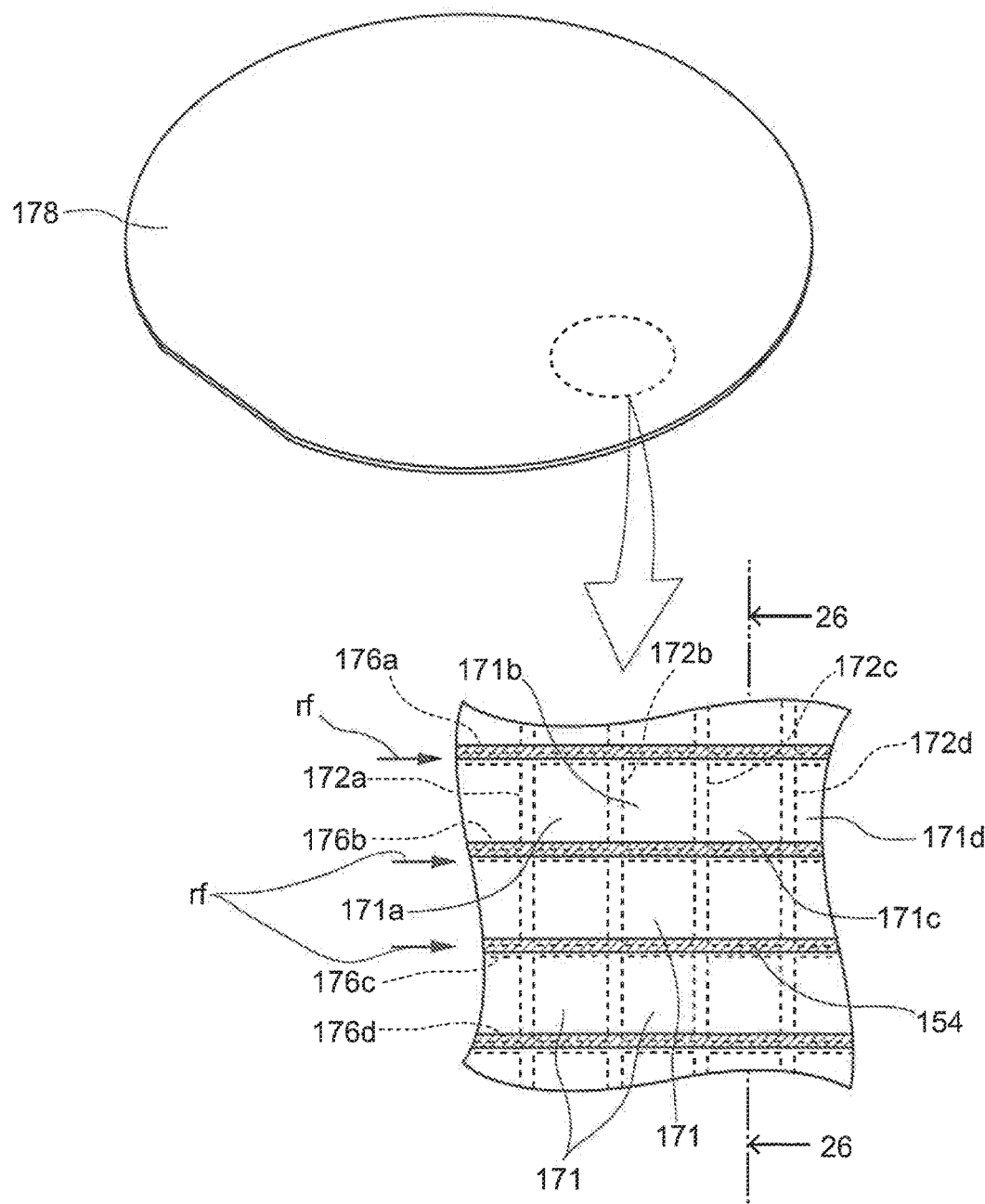
FIG. 25 is a perspective view showing an entirety of the silicon wafer which is used for manufacturing the light source unit according to the modified embodiment 2.
Figure 26:
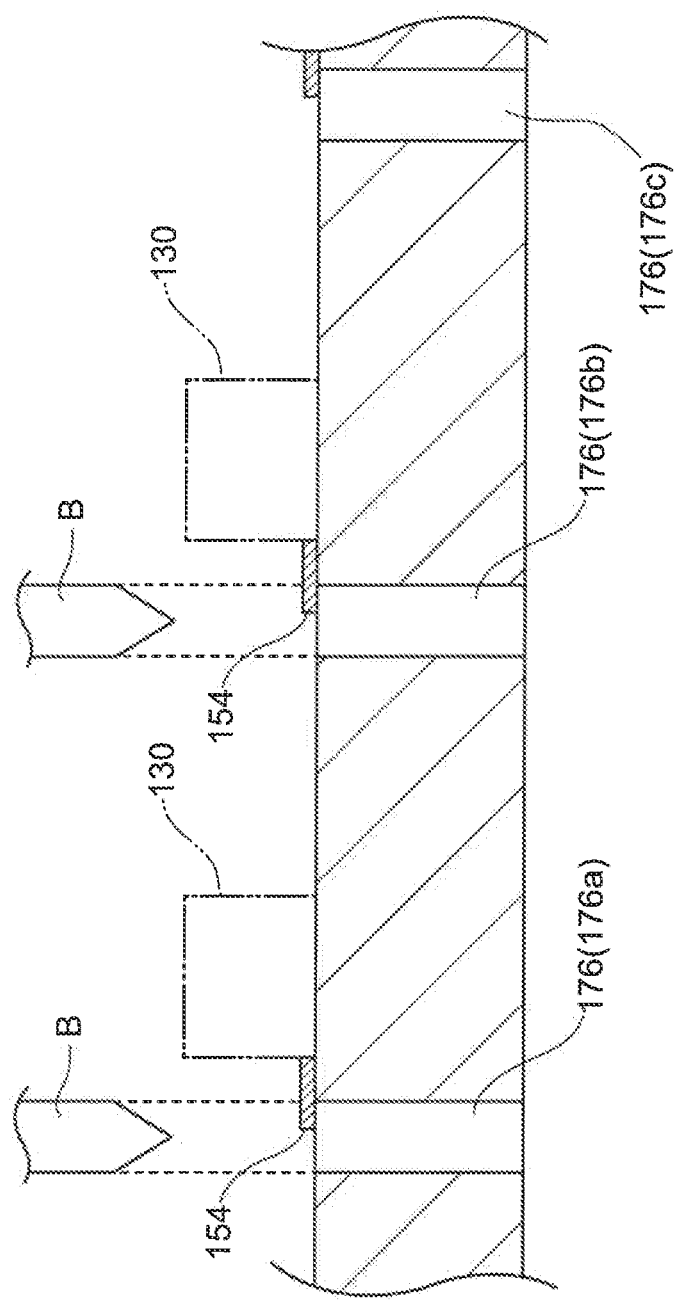
FIG. 26 is a sectional view taken along the line 26-26 in FIG. 25.

Further, when the positioning stoppers 154 are formed, as illustrated in FIG. 25, the positioning stoppers 154 are formed on the silicon wafer 178, in the positioning stopper forming step. In FIG. 25, the positioning stoppers 154 are formed along with the scribe lines 176 (176a, 176b, 176c, 176d . . . ). At this time, as illustrated in FIG. 26, when the silicon wafer 178 is cut, line like parts, which are corresponding to the blade B, are removed as kerfs along with the scribe lines 176 (176a, 176b, 176c, 176d . . . ). Therefore, as illustrated in FIG. 26, when the positioning stoppers 154 are formed, parts of the positioning stoppers 154 may be formed on the scribe lines 176 (176a, 176b, 176c, 176d . . . ).

(Embodiments of Hard Disk Drive)

Figure 27:
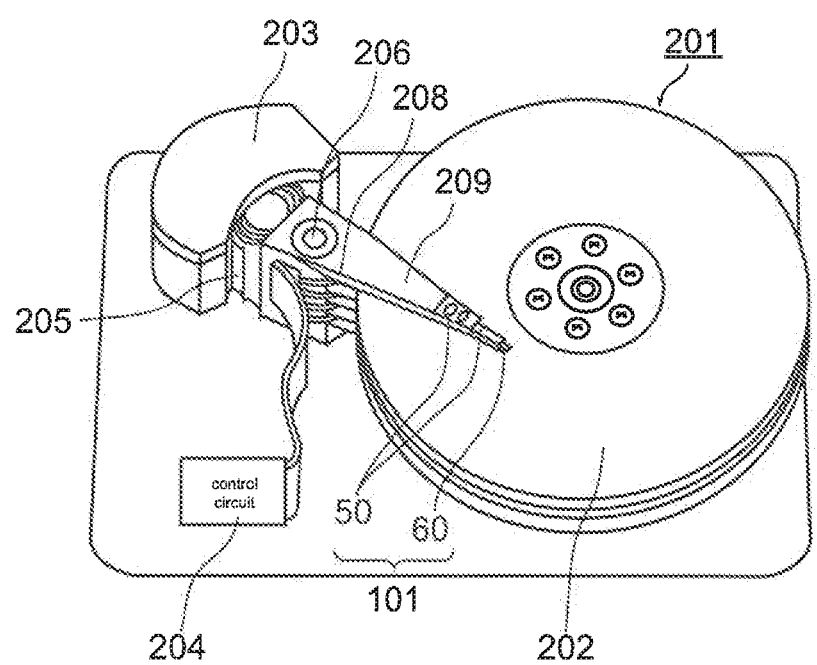
FIG. 27 is a perspective view showing a hard disk drive including the HGA in FIG. 1.
Figure 28:
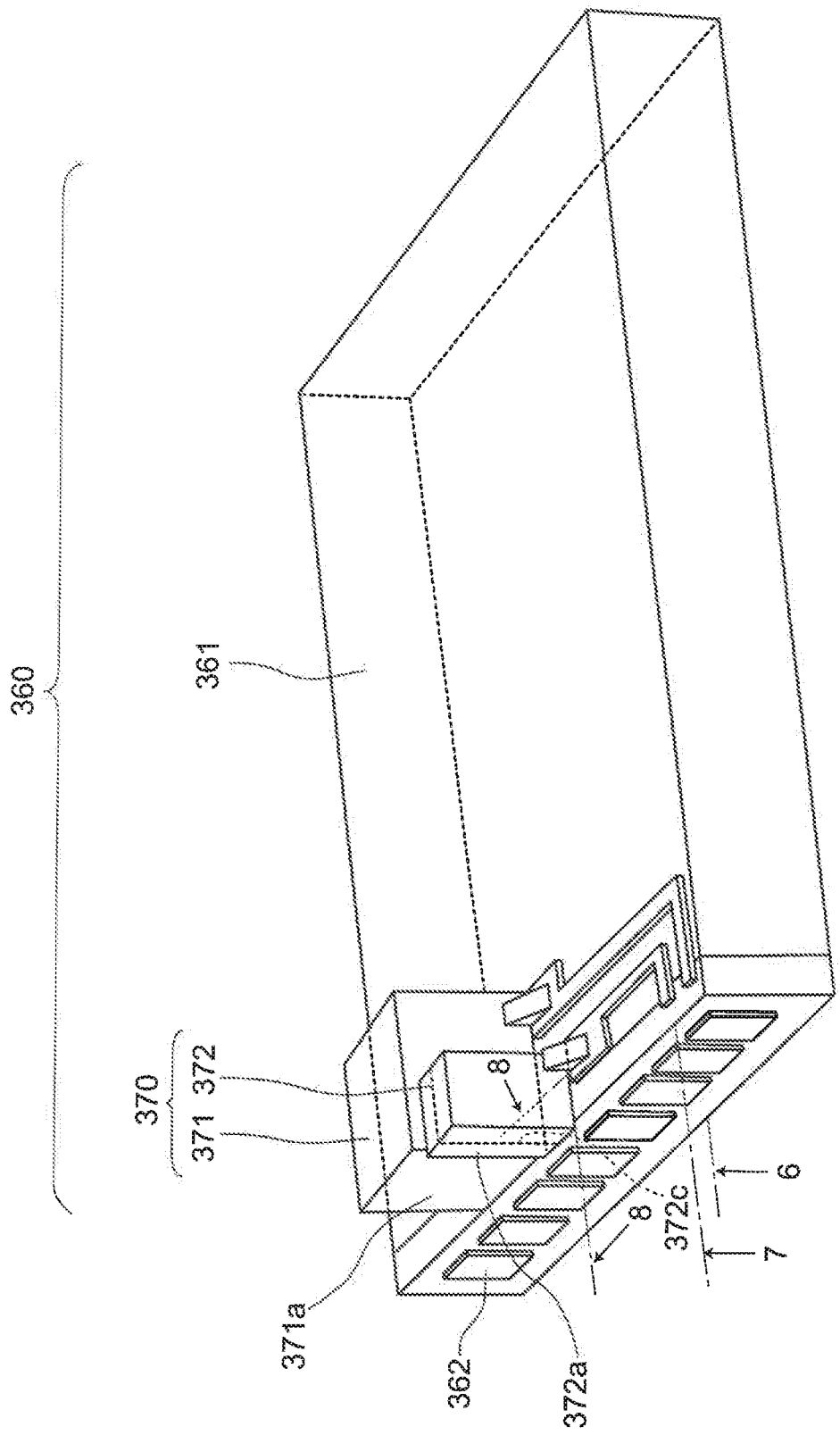
FIG. 28 is a perspective view showing a conventional thermally assisted magnetic head.
Figure 29:
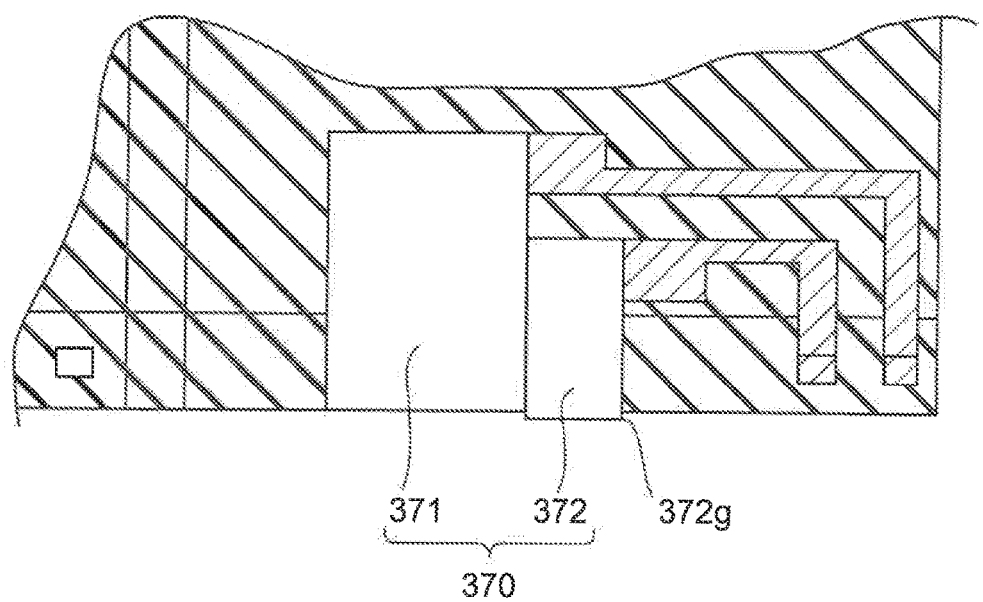
FIG. 29 is a plan view, partly omitted, in FIG. 28.
Figure 30:
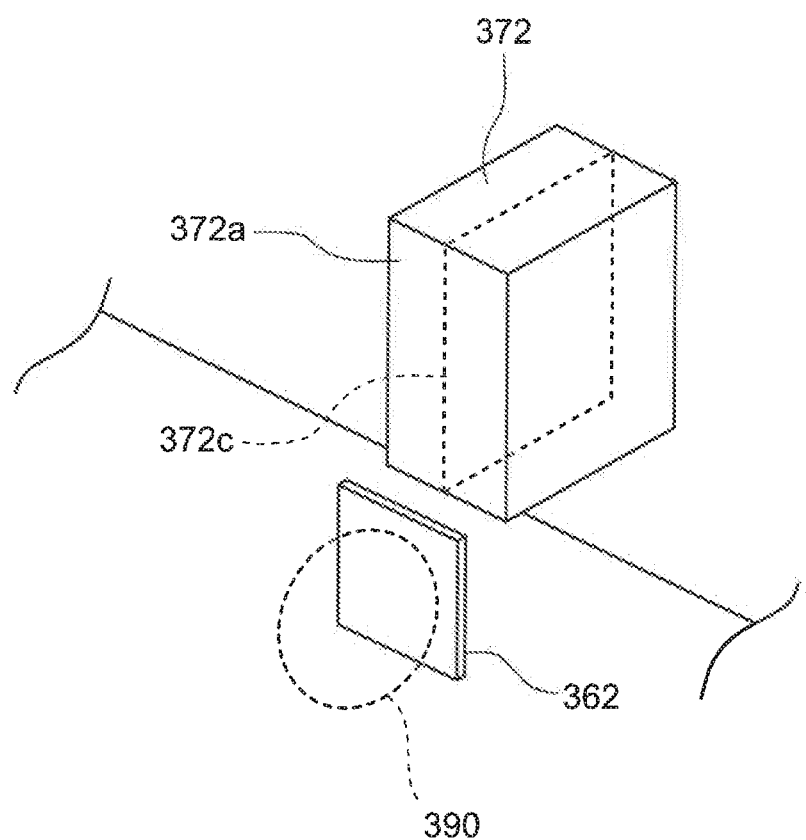
FIG. 30 is a perspective view, partly omitted, showing the laser diode and an electrode constituting a conventional thermally assisted magnetic head.
Figure 31:
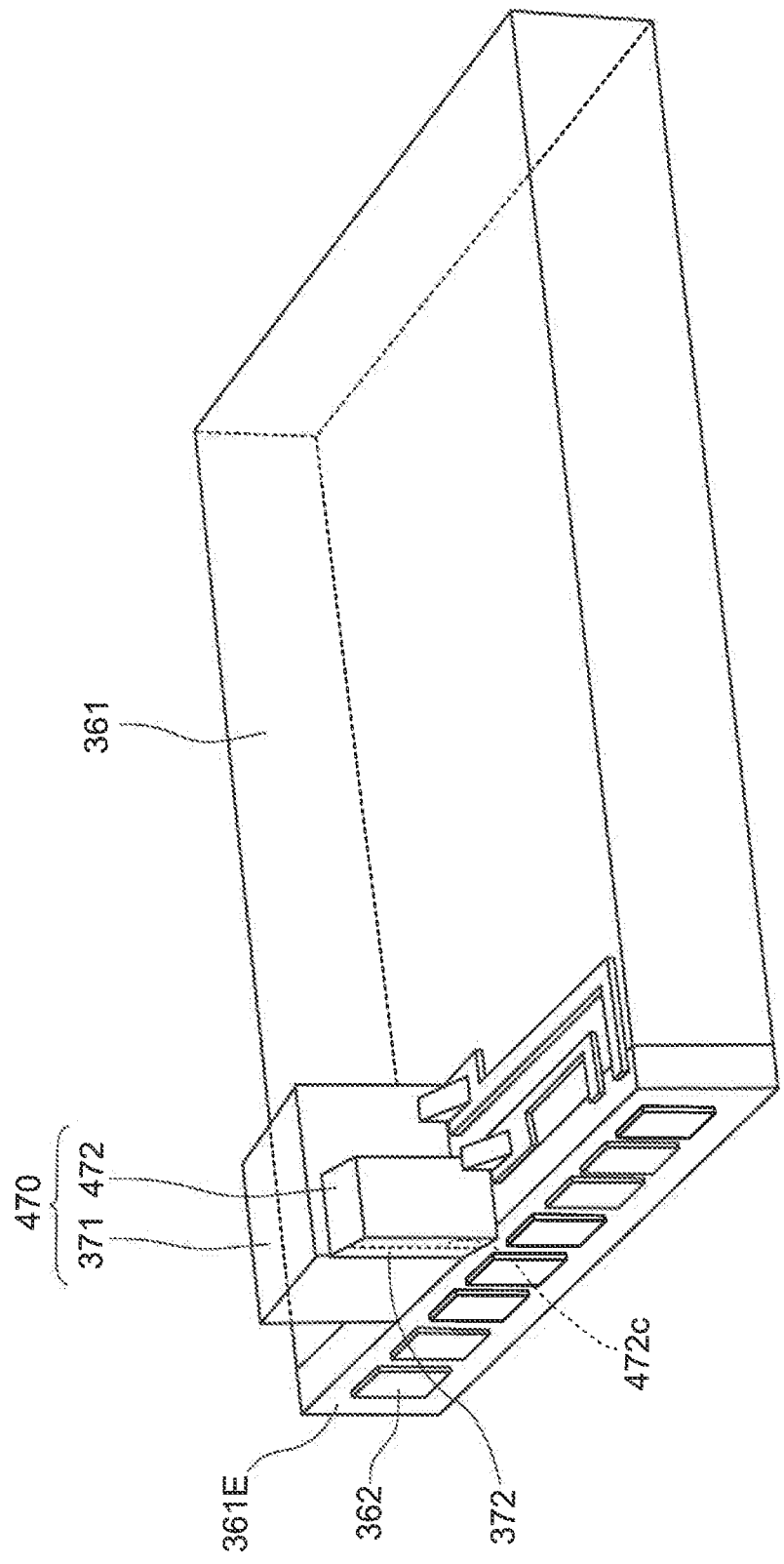
FIG. 31 is a perspective view of the thermally assisted magnetic head including another light source unit with the light source unit in FIG. 28.
Figure 32:
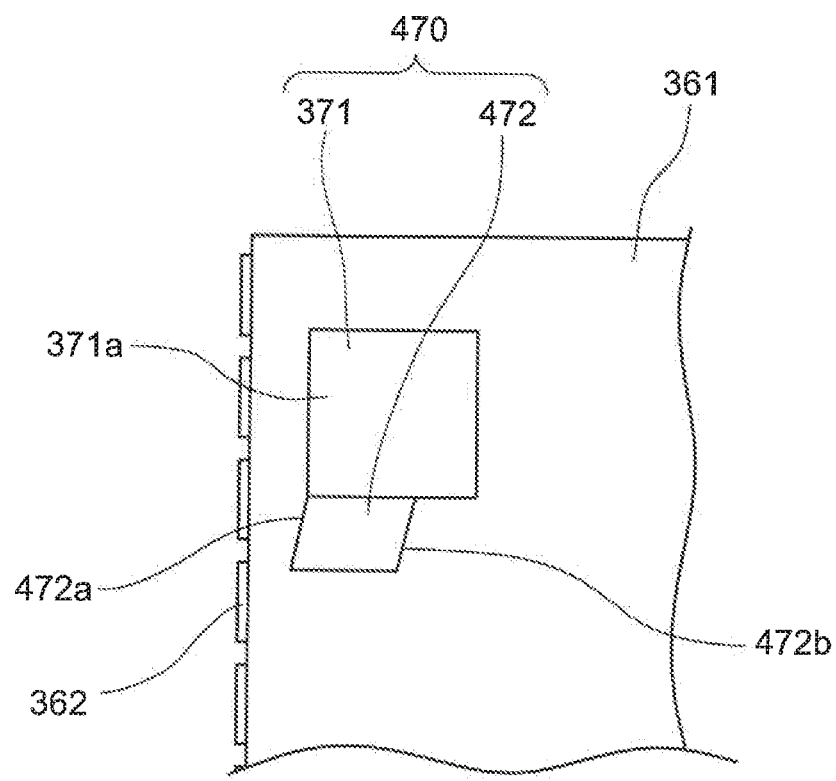
FIG. 32 is a plan view, partly omitted, in FIG. 31.
Figure 33:
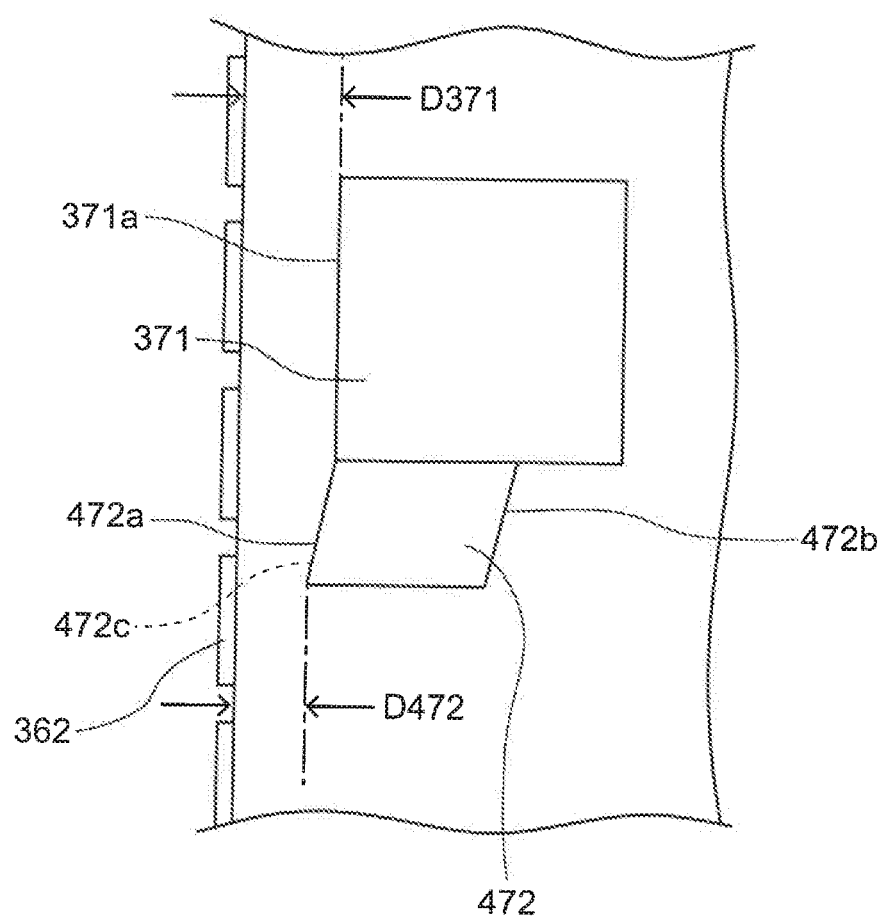
FIG. 33 is a plan view, with enlargement, showing a principal part of FIG. 32.

Next, embodiments of the hard disk drive will be explained with reference to FIG. 27. FIG. 27 is a perspective view showing a hard disk drive 201 equipped with the HGA 101 having the above-described thermally assisted magnetic head 60. The hard disk drive 201 includes a hard disk (magnetic recording medium) 202, rotating at a high speed, and the above-described head gimbal assembly (HGA) 101. The hard disk drive 201 is an apparatus which actuates the HGA 101, so as to record/reproduce data onto/from recording surfaces of the hard disk 202. The hard disk 202 has a plurality of (4 in the drawing) platters. Each platter has a recording surface opposing its corresponding the thermally assisted magnetic head 60.

The hard disk drive 201 positions the slider 70 on a track by an assembly carriage device 203. Further, the hard disk drive 201 has a plurality of drive arms 209. The drive arms 209 pivot about a pivot bearing shaft 206 by means of a voice coil motor (VCM) 205, and are stacked in a direction along the pivot bearing shaft 206. Further, the HGA 101 is attached to the tip of each drive arm 209.

Further, the hard disk drive 201 has a control circuit 204 controlling recording/reproducing and the generation of light by the laser diode 130.

In the hard disk drive 201, when the HGA 101 is rotated, the thermally assisted magnetic head 60 moves in a radial direction of the hard disk 202, i.e., a direction traversing track lines.

Though the above-mentioned embodiments explain a type in which a thin-film coil is wound like a flat spiral about the recording magnetic layer by way of example, the present disclosure is also applicable to a type in which the thin-film coil is wound helically about the recording magnetic layer.

A head gimbal assembly may include: a thermally assisted magnetic head; and a suspension. The thermally assisted magnetic head may include a slider, and a light source unit which is joined to the slider. The slider may include a slider substrate and a magnetic head part formed on the slider substrate. The slider substrate may include a light source placing surface which the light source unit is placed on. The light source unit may include a laser diode and a sub-mount which the laser diode is joined to. The magnetic head part may include a medium-opposite surface opposing to a magnetic recording medium, a light source-opposite surface arranged at the rear side of the medium-opposite surface, a waveguide which guides laser light emitted from the laser diode, from the light source-opposite surface to the medium-opposite surface and a slider-front end surface which is connected with the medium-opposite surface and the light source-opposite surface, and having a width being common with that of the medium-opposite surface and the light source-opposite surface. The sub-mount may include a joined-end surface which the laser diode is joined and a mount-front end surface, which intersects with the joined-end surface, and arranged in a direction being along the slider-front end surface. The laser diode may include an electrode surface and a LD-front end surface, which intersects with the electrode surface, and arranged in a direction being along the mount-front end surface.

The light source unit may include a shift joined structure which the laser diode is joined to a shift area of the joined-end surface and the light source unit is mounted on the light source placing surface so that the electrode surface of the laser diode intersects with a laminated surface of the magnetic head part. The shift area is set in a position which is shifted so that the LD-front end surface is further away from the slider-front end surface than the mount-front end surface.

The suspension may include a penetrating opening part which penetrates from a slider arrangement surface which the slider is arranged, to a light source unit arrangement surface which the light source unit protrudes from, and a flexure which forms the slider arrangement surface. The head gimbal assembly may further include an assembly structure which the light source unit is inserted into the penetrating opening part from the slider arrangement surface of the suspension and the light-source unit is protruded from the light source unit arrangement surface, and the slider is adhered to the slider arrangement surface of the suspension, an LD solder connector being formed so that the laser diode is connected to the flexure, and a mount solder connector being formed so that the sub-mount is connected to the flexure.

The head gimbal assembly according to above disclosure, the penetrating opening part may include a three-width structure including a first opening part, a second opening part and a third opening part, respectively having different widths in a direction being along the slider-front end surface. The first opening part may be a part which the magnetic head part is arranged, and having a first width. The second opening part may be a part which the sub-mount and laser diode of the light source unit are arranged, and arranged in a position being further away from the slider-front end surface than the first opening part and having a second width being smaller than the first width. The third opening part may be a part which the sub-mount of the light source unit is arranged, and arranged in a position being further away from the slider-front end surface than the second opening part and having a third width being smaller than the second width.

The head gimbal assembly according to above disclosure, the suspension may include a load beam forming the light source unit arrangement surface. The flexure may include a wiring member which is formed on the slider arrangement surface. The wiring member may include an exposed wiring part which is exposed in the penetrating opening part. The LD solder connector and the mount solder connector may be connected with the exposed wiring part of the wiring member respectively.

The head gimbal assembly according to above disclosure, the suspension may include a load beam forming the light source unit arrangement surface. The flexure may include a wiring member which forms the slider arrangement surface. The wiring member may include an exposed wiring part which is exposed in the penetrating opening part. The exposed wiring part may include an LD extending part extended inside the second opening part, and a mount extending part arranged in the third opening part, and extended toward the sub-mount from the LD extending part. The LD solder connector may be connected with the LD extending part of the wiring member, the mount solder connector is connected with the mount extending part of the wiring member.

A method of manufacturing a light source unit bar like member may include blow steps. A preparing step for preparing a sub-mount substrate which a plurality of mount parts are arranged, in a grid like form, being along scribe lines, and a plurality of laser diodes. A bar like member forming step for forming a plurality of bar like members, which the plurality of mount parts are arranged in a line like form, by cutting the sub-mount substrate being along scribe lines. A shift area setting step for setting shift areas shifted with a fixed size in a direction being away from an edge line of a long-bar like front end surface, intersecting with a long-bar like joined surface, concerning all the mount parts included in the long-bar like joined surface, which the plurality of laser diodes are joined, in the respective bar like members. A laser diodes joining step for joining the laser diodes to the respective shift areas set in the shift area setting step, concerning all the mount parts included in the long-bar like joined surface.

The method of manufacturing a light source unit bar like member according to above disclosure may further include a shift concave part forming step for forming shift concave parts having sizes larger than an electrode bottom surface of the laser diode, concerning all the mount parts included in the long-bar like joined surface of the bar like member.

The method of manufacturing a light source unit bar like member according to above disclosure may further include a positioning stopper forming step for forming positioning stoppers between the shift areas of the long-bar like joined surface and the scribe lines, concerning all the mount parts included in the long-bar like joined surface of the bar like member.

This disclosure is not limited to the foregoing embodiments but various changes and modifications of its components may be made without departing from the scope of the present invention. Besides, it is clear that various embodiments and modified examples of the present disclosure can be carried out on the basis of the foregoing explanation. Therefore, the present disclosure can be carried out in modes other than the above-mentioned best modes within the scope equivalent to the following claims.

The invention claimed is:

1. A thermally assisted magnetic head comprising:
   a slider; and
   a light source unit which is joined to the slider,
   wherein the slider comprises a slider substrate and a magnetic head part formed on the slider substrate,
   wherein the slider substrate comprises a light source placing surface which the light source unit is placed on,
   wherein the light source unit comprises a laser diode and a sub-mount which the laser diode is joined to,
   wherein the magnetic head part comprises a medium-opposite surface opposite to a magnetic recording medium, a light source-opposite surface arranged on an opposite side of the medium-opposite surface, a waveguide which guides laser light emitted from the laser diode from the light source-opposite surface to the medium-opposite surface, and a slider-front end surface which is connected with the medium-opposite surface and the light source-opposite surface,
   wherein the sub-mount comprises a joined-end surface which the laser diode is joined to, and a mount-front end surface which intersects with the joined-end surface, and arranged in a direction being along the slider-front end surface,
   wherein the laser diode comprises an electrode surface and a LD-front end surface, which intersects with the electrode surface, and arranged in a direction being along the mount-front end surface of the sub-mount,
   wherein the light source unit comprises a shift joined structure where the laser diode is joined to a shift area of the joined-end surface of the sub-mount, thereby the light source unit is mounted on the light source placing surface so that the electrode surface of the laser diode intersects with a laminated surface of the magnetic head part,
   wherein the shift area is set in a position which is shifted so that the LD-front end surface is further away from the slider-front end surface than the mount-front end surface.

2. The thermally assisted magnetic head according to claim 1,
   wherein a part of the light source unit is arranged on the magnetic head part.

3. The thermally assisted magnetic head according to claim 1,
   wherein the laser diode comprises an electrode bottom surface opposite to the electrode surface,
   wherein the sub-mount comprises a shift concave part having a size larger than the electrode bottom surface of the laser diode,
   wherein the shift concave part is formed in the shift area of the joined-end surface, wherein the electrode bottom surface is fitted in the shift concave part and the laser diode is joined to the sub-mount thereby.

4. The thermally assisted magnetic head according to claim 1,
   wherein the sub-mount comprises a positioning stopper which is formed between the shift area of the joined-end surface and the mount-front end surface,
   wherein the laser diode is joined to the shift area, being contact with the positioning stopper so that the laser diode is away from the mount-front end surface.

5. The thermally assisted magnetic head according to claim 3, further comprising:
   a solder layer which is formed between a bottom part of the shift concave part and the electrode bottom surface of the laser diode,
   wherein the shift concave part has a depth which is larger than the thickness of the solder layer.

6. The thermally assisted magnetic head according to claim 4, further comprising:
   a solder layer which is formed between the joined-end surface and the electrode bottom surface of the laser diode,
   wherein the positioning stopper has a thickness which is larger than the thickness of the solder layer.

7. A light source unit bar like member comprising:
a bar like member which is formed in a long-bar like form; and
a plurality of laser diodes,
wherein the bar like member comprises a mount-line structure including a long-bar like joined surface and a long-bar like front end surface intersecting with the long-bar like joined surface,
wherein the long-bar like joined surface and long-bar like front end surface are formed of a plurality of mount parts being arranged in a long bar-like form and being separated by scribe lines,
wherein the laser diodes respectively comprise electrode surfaces and LD-front end surfaces,
wherein the light source unit bar like member further comprises a line-like shift-joined structure which the respective laser diodes are joined to the respective shift areas of the respective mount parts so that the LD-front end surface is arranged along the scribe line,
wherein the shift area is set in a position which is shifted with a certain size on the long-bar like joined surface, along the direction being away from the scribe line, concerning all the mount parts.

8. The light source unit bar like member according to claim 7,
wherein the laser diodes respectively comprise electrode bottom surfaces, being opposite to the electrode surfaces,
wherein the respective sub-mounts comprise shift concave parts having sizes larger than the electrode bottom surfaces of the laser diodes,
wherein the shift concave parts are formed in the shift areas of the respective mount parts in the long-bar like joined-end surface,
wherein the electrode bottom surfaces are fitted in the shift concave parts and the respective laser diodes are joined to the respective mount parts thereby.

9. The light source unit bar like member according to claim 7,
wherein the respective mount parts further comprise positioning stoppers which are formed between the shift areas of the long-bar like joined surface and the scribe lines,
wherein the respective laser diodes are joined to the shift areas, being contact with the positioning stoppers so that the laser diodes are away from the scribe lines.

10. The light source unit bar like member according to claim 8, further comprising:
solder layers which are formed between bottom parts of the shift concave parts and the electrode bottom surfaces of the laser diodes,
wherein the shift concave parts respectively have depths which are larger than the thicknesses of the solder layers.

11. The light source unit bar like member according to claim 9, further comprising:
solder layers which are respectively formed between the long-bar like joined surface and the electrode bottom surface of the laser diode,
wherein the positioning stoppers respectively have thicknesses which are larger than the thicknesses of the solder layers.

12. A hard disk drive comprising a head gimbal assembly and a magnetic recording medium, wherein the head gimbal assembly comprises a thermally assisted magnetic head and a suspension,
wherein the thermally assisted magnetic head comprises a slider, and a light source unit which is joined to the slider,
wherein the slider comprises a slider substrate and a magnetic head part formed on the slider substrate,
wherein the slider substrate comprises a light source placing surface which the light source unit is placed on,
wherein the light source unit comprises a laser diode and a sub-mount which the laser diode is joined to,
wherein the magnetic head part comprises a medium-opposite surface opposing to a magnetic recording medium, a light source-opposite surface arranged at rear side of the medium-opposite surface, a waveguide which guides laser light, emitted from the laser diode, from the light source-opposite surface to the medium-opposite surface and a slider-front end surface which is connected with the medium-opposite surface and the light source-opposite surface, and having a width being common with the medium-opposite surface and the light source-opposite surface,
wherein the sub-mount comprises a joined-end surface which the laser diode is joined to and a mount-front end surface which intersects to the joined-end surface, and arranged in a direction being along the slider-front end surface,
wherein the laser diode comprises an electrode surface and an LD-front end surface which intersects with the electrode surface and is arranged in a direction being along the mount-front end surface,
wherein the light source unit comprises a shift joined structure which the laser diode is joined to a shift area of the joined-end surface and the light source unit is mounted on the light source placing surface so that the electrode surface of the laser diode intersects with a laminated surface of the magnetic head part,
wherein the shift area is set in a position which is shifted so that the LD-front end surface is further away from the slider-front end surface than the mount-front end surface,
wherein the suspension comprises a penetrating opening part which penetrates from a slider arrangement surface, which the slider is arranged, to a light source unit arrangement surface, which the light source unit is arranged, and a flexure which forms the slider arrangement surface,
wherein the head gimbal assembly further comprises an assembly structure which the light source unit is inserted into the penetrating opening part from the slider arrangement surface of the suspension and the light source unit protrudes from the light source unit arrangement surface and the slider is adhered to the slider arrangement surface of the suspension, an LD solder connector being formed so that the laser diode is connected to the flexure, and a mount solder connector being formed so that the sub-mount is connected to the flexure.

* * * * *